US005606427A

United States Patent [19]
Sato

[11] Patent Number: 5,606,427
[45] Date of Patent: Feb. 25, 1997

[54] VIDEO DEVICE FOR RECORDING A HIGH DEFINITION STILL IMAGE

[75] Inventor: Koichi Sato, Tokyo, Japan

[73] Assignee: Asahi Kogaku Kogyo Kabushiki Kaisha, Tokyo, Japan

[21] Appl. No.: 416,471

[22] Filed: Apr. 4, 1995

Related U.S. Application Data

[63] Continuation of Ser. No. 203,595, Feb. 28, 1994, abandoned, which is a continuation of Ser. No. 913,191, Jul. 14, 1992, abandoned.

[30] Foreign Application Priority Data

| Jul. 16, 1991 | [JP] | Japan | 3-268104 |
| Aug. 9, 1991 | [JP] | Japan | 3-285382 |
| Aug. 26, 1991 | [JP] | Japan | 3-296745 |
| Aug. 26, 1991 | [JP] | Japan | 3-296746 |

[51] Int. Cl.$^6$ .................................................. H04N 5/781
[52] U.S. Cl. .............................. 358/342; 358/310; 360/22
[58] Field of Search ............................. 358/310, 335, 358/326, 323, 342, 315, 316, 318; 360/33.1, 32, 22, 18; H04N 5/76, 5/78, 5/781, 5/782, 5/783, 9/79, 9/89, 5/92

[56] References Cited

U.S. PATENT DOCUMENTS

| 3,949,414 | 4/1976 | Hayashi | 358/316 |
| 4,428,003 | 1/1984 | Sugiyama et al. | |
| 4,458,271 | 7/1984 | Horstmann | 358/310 |
| 4,609,949 | 9/1986 | Kutaragi. | |
| 4,668,985 | 5/1987 | Kurashige et al. | 360/22 |
| 4,700,239 | 10/1987 | Yoshinaka et al. | 358/310 |
| 4,709,276 | 11/1987 | Yoshinaka | 358/326 |
| 4,757,392 | 7/1988 | Awamoto et al. | 360/22 |
| 4,780,769 | 10/1988 | Numakura et al. | 358/320 |
| 4,825,301 | 4/1989 | Pape et al. | |
| 4,858,025 | 8/1989 | Tabei. | |
| 4,910,605 | 3/1990 | Sasaki et al. | |
| 4,939,586 | 7/1990 | Nabati et al. | |
| 5,065,259 | 11/1991 | Kubota et al. | 358/310 |
| 5,075,802 | 12/1991 | Ohashi. | |
| 5,121,218 | 6/1992 | Miyake et al. | 358/342 |
| 5,153,740 | 10/1992 | Sato. | |
| 5,162,922 | 11/1992 | Takemura et al. | 360/22 |
| 5,392,128 | 2/1995 | Sato. | |

FOREIGN PATENT DOCUMENTS

| 0084241 | 7/1983 | European Pat. Off. . |
| 0129393 | 12/1984 | European Pat. Off. . |
| 0141130 | 5/1985 | European Pat. Off. . |
| 0149244 | 7/1985 | European Pat. Off. . |
| 0154533 | 9/1985 | European Pat. Off. . |
| 0162689 | 11/1985 | European Pat. Off. . |
| 0234483 | 9/1987 | European Pat. Off. . |
| 0299228 | 1/1989 | European Pat. Off. . |

(List continued on next page.)

OTHER PUBLICATIONS

Patent Abstracts of Japan, vol. 8, No. 213 (E–269), Sep. 28, 1984, JP–A59 097 272.

Hashimoto "Experimental HDTV Digital VTR With A Bit Rate Of 1 Gbps", IEEE Transactions of Magnetics, vol. 23, No. 5, pp. 3167 through 3172, Sep. 1987, New York, United States.

Fernsehtechnik ohne Ballast (TV Technology), Otto Limann/Horst Pelka, 14th edition, Munich, Publisher: Franzis', 1983, pp. 28–30, 397 and 398, ISBN 3-7723-5274-X.

*Primary Examiner*—Thai Q. Tran
*Attorney, Agent, or Firm*—Greenblum & Bernstein P.L.C.

[57] ABSTRACT

A still video device in which image signals corresponding to one frame are divided into a plurality of parts. The divided image signals are stored in memory recording areas. The divided image signals are time-expanded to be recorded in a magnetic disk, and further, the divided image signals may be time-expanded and subsampled to be recorded in the magnetic disk. Due to this time-expansion or subsampling, the bandwidth of the image signals recorded in the magnetic disk is narrower than image signals inputted to the still video device. Namely, image signals having a bandwidth broader than that of the inputted image signals can be recorded in the magnetic disk.

38 Claims, 30 Drawing Sheets

FOREIGN PATENT DOCUMENTS

| | | |
|---|---|---|
| 0424138 | 4/1991 | European Pat. Off. . |
| 0296948 | 12/1993 | European Pat. Off. . |
| 2489996 | 3/1982 | France . |
| 3436282 | 4/1985 | Germany . |
| 59-97272 | 6/1984 | Japan . |
| 6437193 | 2/1989 | Japan . |
| 1177289 | 7/1989 | Japan .............................. H04N 5/92 |
| 1212193 | 8/1989 | Japan . |
| 2181572 | 7/1990 | Japan . |
| 2180483 | 7/1990 | Japan . |
| 2177793 | 7/1990 | Japan . |
| 2177792 | 7/1990 | Japan . |
| 2185182 | 7/1990 | Japan . |
| 2086641 | 5/1982 | United Kingdom . |

Fig. 16

FRAME DIVISION MODE (2bit)

|  | A | B |
|---|---|---|
| WITHOUT DIVISION | 0 | 0 |
| 2 DIVISION | 0 | 1 |
| 4 DIVISION | 1 | 0 |
| H2 DIVISION | 1 | 1 |

Fig. 17

PROCESS MODE (2bit)

|  | A | B |
|---|---|---|
| NORMAL | 0 | 0 |
| SUBSAMPLING | 0 | 1 |
| TIME-EXPANSION | 1 | 0 |
| SUBSAMPLING & TIME-EXPANSION | 1 | 1 |

Fig. 18

RECORDING AREA (3bit)

|  | A | B | C |
|---|---|---|---|
| FIRST AREA | 0 | 0 | 1 |
| SECOND AREA | 0 | 1 | 0 |
| THIRD AREA | 0 | 1 | 1 |
| FOURTH AREA | 1 | 0 | 0 |
| FIFTH AREA | 1 | 0 | 1 |
| SIXTH AREA | 1 | 1 | 0 |
| SEVENTH AREA | 1 | 1 | 1 |
| EIGHTH AREA | 0 | 0 | 0 |

Fig. 19

FRAME RECOGNITION (5bit)

|  | A | B | C | D | E |
|---|---|---|---|---|---|
| FIRST FRAME | 0 | 0 | 0 | 0 | 1 |
| SECOND FRAME | 0 | 0 | 0 | 1 | 0 |
| . | . | . | . | . | . |
| . | . | . | . | . | . |
| . | . | . | . | . | . |
| 31st FRAME | 1 | 1 | 1 | 1 | 1 |
| 32nd FRAME | 0 | 0 | 0 | 0 | 0 |

Fig. 24
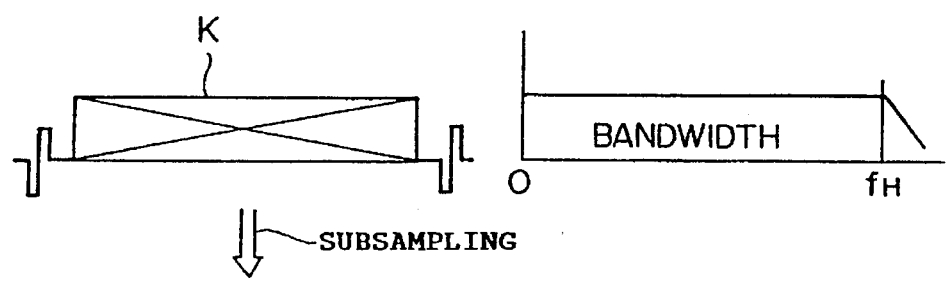
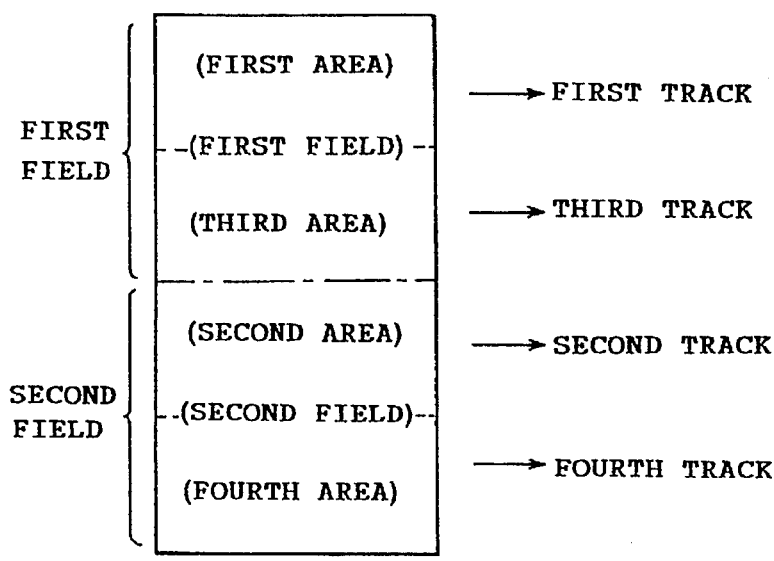
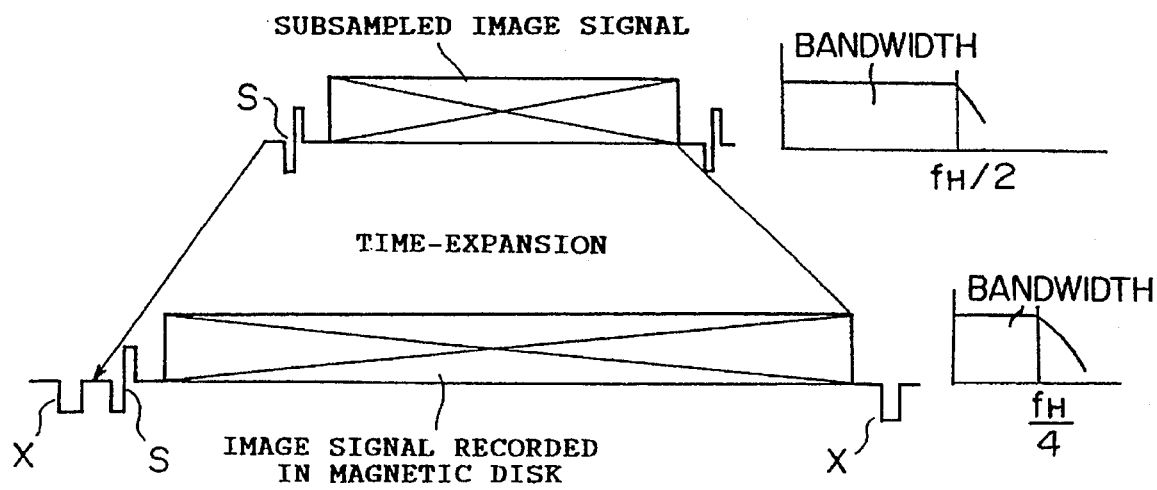

VIDEO DEVICE FOR RECORDING A HIGH DEFINITION STILL IMAGE

This application is a continuation of application Ser. No. 08/203,595, filed Feb. 28, 1994, now abandoned, which is a continuation of application Ser. No. 07/913,191, filed Jul. 14, 1992, now abandoned.

BACKGROUND OF THE INVENTION

1. Field of the Invention

The present invention relates to a still video device in which an image signal is recorded in a recording medium, such as a magnetic disk.

2. Description of the Related Art

In a usual still video device, an image signal inputted thereto is frequency-modulated and recorded in a magnetic disk, and a band of the signal recorded in the magnetic disk is regulated (or made constant). Nevertheless, the bandwidth of the signal is limited, due to a construction of the disk device, and thus, cannot be freely expanded.

Accordingly, in a conventional still video device, when an image signal having a high quality, or broad bandwidth, is inputted to the still video device, a resolution limitation of the image is imposed, and thus, the quality of the image is lowered.

SUMMARY OF THE INVENTION

Therefore, an object of the present invention is to provide a still video device in which a high quality image can be obtained without changing a bandwidth of an image signal recorded in a recording medium, such as a magnetic disk.

According to the present invention, there is provided a still video device comprising a dividing mechanism and a recording mechanism. The dividing mechanism divides the image signals corresponding to one frame into a plurality of parts. The recording mechanism records the divided parts of image signals in a recording medium, while time-expanding the divided parts.

Further, according to the present invention, there is provided a still video device in which image signals are recorded in recording areas of a recording medium, the still video device comprising a dividing mechanism, a recording mechanism, an annexing mechanism, and a reproducing mechanism. The dividing mechanism divides image signals corresponding to one frame into a plurality of parts. The recording mechanism records the divided parts of image signals in separate recording areas of a recording medium, respectively. The annexing mechanism annexes a reference signal to each of the image signals when the recording means record the image signals in the recording medium. The reproducing mechanism reproduces the image signals in such a manner that the reference signal has a predetermined amplitude.

BRIEF DESCRIPTION OF THE DRAWINGS

The present invention will be better understood from the description of the preferred embodiments of the invention set forth below, together with the accompanying drawings, in which:

FIG. 16 is a table showing information related to a frame division mode;

FIG. 17 is a table showing a processing mode in which image signals are recorded in the magnetic disk;

FIG. 18 is a table showing information related to a recording area of a memory;

FIG. 19 is a table showing information related to a frame recognition;

FIG. 24 is a diagram showing a relationship among inputted image signals, image signals recorded in memories, and image signals recorded in a magnetic disk;

DESCRIPTION OF THE PREFERRED EMBODIMENTS

Figure 1:
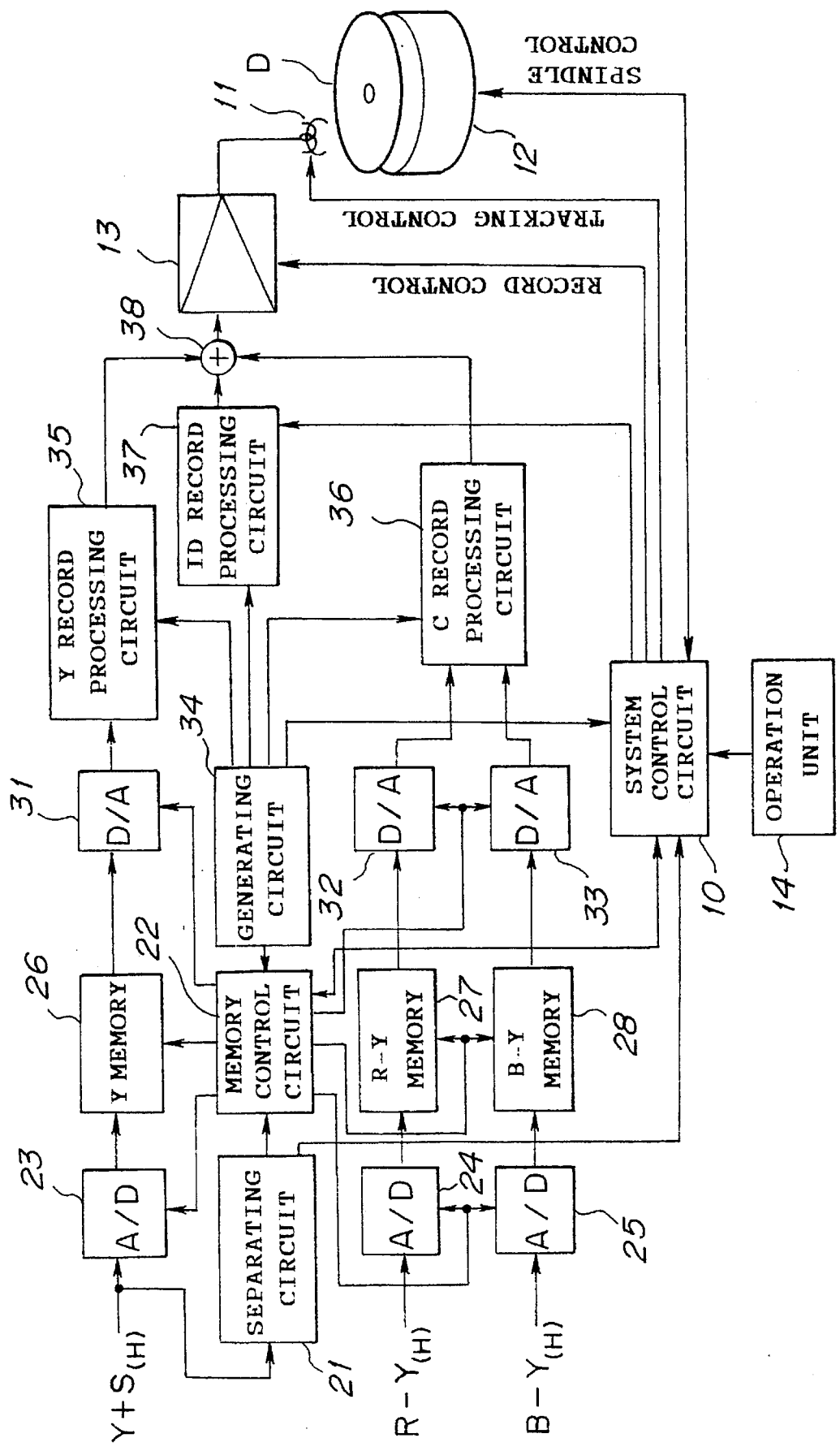
FIG. 1 is a block diagram showing a recording system of a still video device according to an embodiment of the present invention.

The present invention will now be described with reference to embodiments shown in the drawings.

FIG. 1 is a block diagram showing a recording system of a still video device according to a first embodiment of the present invention.

A system control circuit 10, such as a microcomputer, controls the still video device as a whole; the still video device having a magnetic head 11 and a spindle motor 12 for rotating a magnetic disk D. The magnetic head 11 is controlled by the system control circuit 10 to be displaced along a radial direction of the magnetic disk D, and thus positioned at a predetermined track of the magnetic disk D. The spindle motor 12 is controlled by the system control circuit 10 to rotate the magnetic disk D at a rotation speed of, for example, 3600 rpm. During the rotation of the magnetic disk D, the magnetic head 11 is positioned at a predetermined track of the magnetic disk D and records image signals and identification (ID) codes on this track. The recording amplifier 13 is controlled by the system control circuit 10 and outputs image signals, ID codes and other signals to the magnetic head 11. Note that, the magnetic disk D has 52 tracks, and the image signals and the other signals are recorded on 50 tracks starting from the outermost track and continuing inward of the magnetic disk D.

An operation unit 14 is connected to the system control circuit 10, to operate the still video device. Note that, a record mode, a photographing date, a frame division mode (described later), and so on, which are ID codes related to an image recorded in the magnetic disk D, are inputted through the operation unit 14.

High quality image signals obtained through a still video camera (not shown) or an outer input terminal (not shown) are inputted to the still video device as an R–Y and a B–Y differential color signal and a luminance signal (Y+S) including a horizontal synchronizing signal. Note that, the inputted image signals have been generated in accordance with a HDTV (High Definition TV) mode. Further note that, in the drawing, reference "H" added to the luminance signal and the differential color signal refers to high quality.

A horizontal synchronizing signal S included in the luminance signal (Y+S) is separated from the luminance signal (Y+S) by a synchronizing signal separating circuit 21, and transmitted to a memory control circuit 22 and the control circuit 10. The memory control circuit 22 controls A/D converters 23, 24, 25, a Y memory 26, an R–Y memory 27 and a B–Y memory 28, based on the horizontal synchronizing signal S. The memory control circuit 22 controls D/A converters 31, 32, 33, the Y memory 26, the R–Y memory 27 and the B–Y memory 28, based on a synchronizing signal outputted from a synchronizing signal generating circuit 34 to be described later.

The luminance signal (Y+S) including the horizontal synchronizing signal is A/D converted by the A/D converter 23, and a luminance signal Y recorded between two horizontal synchronizing signals is stored in the Y memory 26. Similarly, the R–Y differential color signal is A/D converted by the A/D converter 24 and stored in the R–Y memory 27, and the B–Y differential color signal is A/D converted by the A/D converter 25 and stored in the B–Y memory 28.

The luminance signal Y stored in the Y memory 26, the R–Y differential color signal stored in the R–Y memory 27, and the B–Y differential color signal stored in the B-Y memory 28 are D/A converted by D/A converters 31, 32 and 33, respectively, which are operated based upon a synchronizing signal (a standard clock signal) outputted from the synchronizing signal generating circuit 34. Note that, the period of the above-mentioned standard clock signal is half, for example, of that of a standard clock signal used for recording an image signal to the memories 26, 27 and 28. Accordingly, the image signals are read out from each of the memories 26, 27 and 28 at a relatively slow speed, whereby the image signals are time-expanded. The D/A converted luminance signal Y is inputted to a Y record processing circuit 35 and subjected to a process; such as an FM-modulation process. The D/A converted R–Y and B–Y differential color signals are inputted to a C record processing circuit 36 and subjected to a process; such as an FM-modulation process.

An ID code inputted through the operating unit 14 and the control circuit 10 is subjected to a process; such as a differential phase shift keying (DPSK) modulation process, by an ID record processing circuit 37.

The DPSK-modulated ID code, the FM-modulated luminance signal and differential color signal are superimposed one on the other by an adder 38, and then amplified by the record amplifier 13 and transmitted to the magnetic head. The ID code, the luminance signal and the differential color signal are then recorded on a predetermined track of the magnetic disk D through the magnetic head 11. The signals recorded in the magnetic disk D have been time-expanded in comparison with signals inputted to the still video device; as described above. For a time-expansion recording of the image signals in the magnetic disk D, the inputted image signals are divided into a plurality of parts to be stored in the memories 26, 27 and 28.

Figure 2:
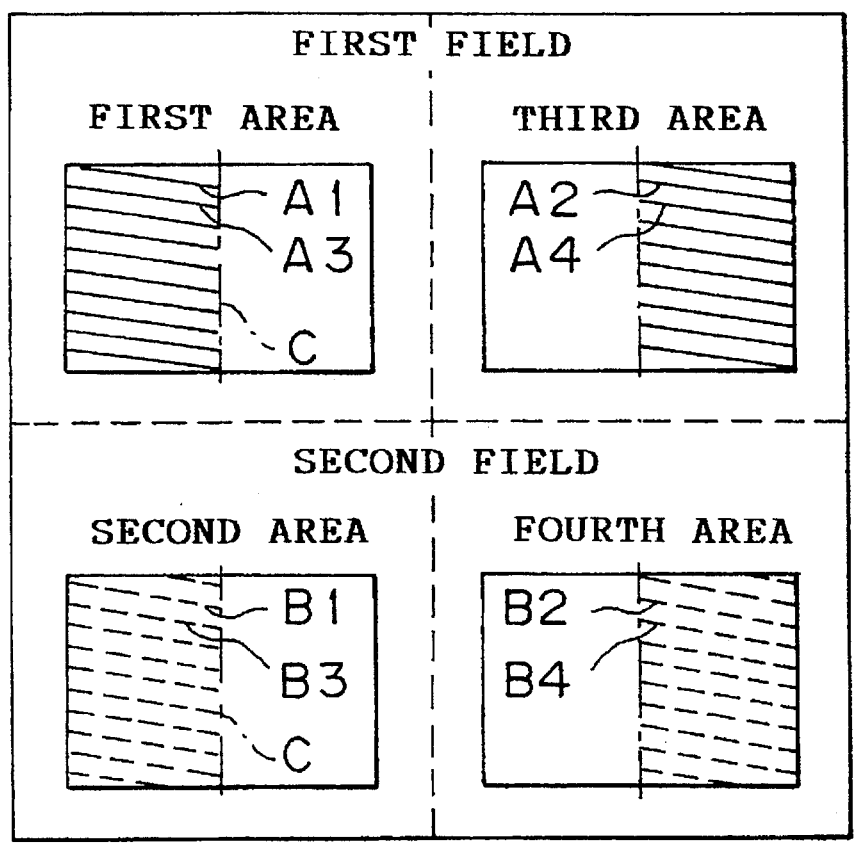
FIG. 2 is a diagram schematically showing a record example of image signals in memories in the embodiment.

FIG. 2 schematically shows a record example of image signals in the Y memory 26, the R–Y memory 27 and B–Y memory 28. Note that, in the drawing, the number of scanning lines and the positions at which the scanning lines are started in the frame are not exactly shown. In FIG. 2, the image signals are recorded in a frame record mode, and the number of scanning lines of the inputted image signals and the line frequency (horizontal scanning frequency) of the inputted image signals are the same as for the still video format. Namely, one frame is composed of a first field and a second field. The scanning lines A1 through A4 shown by solid lines denote the first field, and the scanning lines B1 through B4 shown by broken lines denote the second field. The frame is divided into two parts by a center line C extending in a vertical direction and passing through the center of the frame. Note that, the band of the image signals is twice that of a conventional still video device.

The image signals corresponding to a left side frame of the first field are stored in a first recording area of the memory. The image signals corresponding to a right side frame of the first field are stored in a third recording area of the memory. Further, the image signals corresponding to a left side frame of the second field are stored in a second recording area of the memory, and the image signals corresponding to a right side frame of the second field are stored in a fourth recording area of the memory. The image signals stored in the first through the fourth recording areas are recorded in first through fourth tracks of the magnetic disk D.

Figure 3:
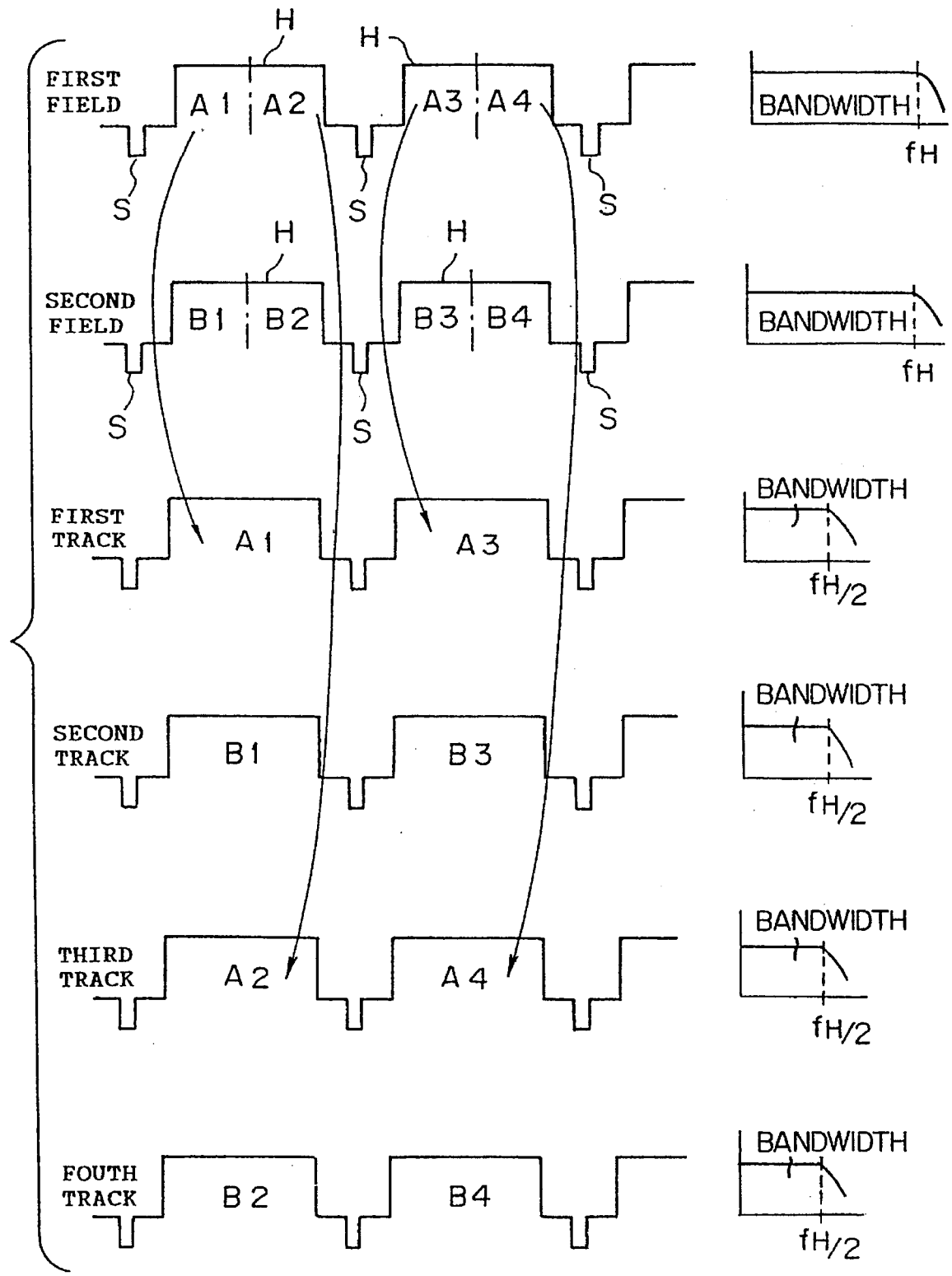
FIG. 3 is a diagram showing a relationship between image signals inputted to a still video device and image signals stored in a magnetic disk in the embodiment.

FIG. 3 shows a relationship between image signals inputted to the still video device and image signals stored in the magnetic disk D. With reference to FIGS. 2 and 3, a relationship among the image signals inputted to the still video device, the image signals stored in the memories 26, 27 and 28, and the image signals recorded in the magnetic disk D will be explained.

As described above, in this embodiment, the image signals are recorded in the frame record mode therefore; for one frame, the first and second field image signals are inputted to the still video device. The image signals forming one field are composed of a number of scanning lines H, and image signals corresponding to one scanning line H are sandwiched by two horizontal synchronizing signals S as shown in FIG. 3.

In the first field, the horizontal scanning line H positioned at the leftmost side of FIG. 3 is composed of the image signals A1 and A2, and the horizontal scanning line H positioned at the second left in FIG. 3 is composed of the image signals A3 and A4. The image signals A1 and A3 correspond to a left half of the frame, and are stored in the first recording area of the memory, as shown in FIG. 2. The image signals A2 and A4 correspond to a right half of the frame, and are stored in the third recording area of the memory, as also shown in FIG. 2. Namely, with regard to one horizontal scanning line H, a part corresponding to the left half of the frame is stored in the first recording area of the memory, and a part corresponding to the right half of the frame is stored in the third recording area of the memory. Similarly, in the second field, the image signals B1 and B3 correspond to a left half of the frame and are stored in the second recording area of the memory, and the image signals B2 and B4 correspond to a right half of the frame and are stored in the fourth recording area of the memory.

The image signals stored in the first through fourth recording areas of the memory are recorded in first through fourth tracks of the magnetic disk D, respectively. Therefore, scanning lines corresponding to the left half of the frame in the first field are recorded in the first track, and scanning lines corresponding to the left half of the frame in the second field are recorded in the second track. Further, scanning lines corresponding to the right half of the frame in the first field are recorded in the third track, and scanning lines corresponding to the right half of the frame in the second field are recorded in the fourth track.

Namely, when reproducing the first and the second tracks, the image of the left half of the frame is reproduced, and when reproducing the third and the fourth tracks, the image of the right half of the frame is reproduced. When the magnetic disk in which image signals are recorded in the manner described above is reproduced in the frame reproduction mode by a conventional still video device, a half part of one frame can be reproduced as a high definition image.

A bandwidth of the image signals inputted to the still video device is $f_H$, and the image signals are stored in the memories 26, 27 and 28 with this bandwidth $f_H$. When read out from the memories 26, 27 and 28, the image signals are time-expanded twice. Namely, the bandwidth of the image signals recorded in the magnetic disk D is $f_H/2$.

The band used for recording the image signals in the magnetic disk D is determined by the structure of a disk device. Therefore, image signals having a wider bandwidth cannot be recorded in the disk D. In this embodiment, however, for one frame, image signals are divided into a plurality of parts to be recorded in the memories 26, 27 and 28, and then, the divided image signals are read out from the memories 26, 27 and 28 while being subjected to a time-expansion, and are recorded in the magnetic disk D with a predetermined bandwidth. Accordingly, even when a bandwidth of inputted image signals is wider than that of image signals recorded in the magnetic disk D, the content of the inputted image signals can be stored in the magnetic disk D as it is. Namely, even when image signals of a high quality or high definition image are inputted to the still video device, the image signals can be recorded in the magnetic disk D while maintaining the high quality thereof.

Figure 4:
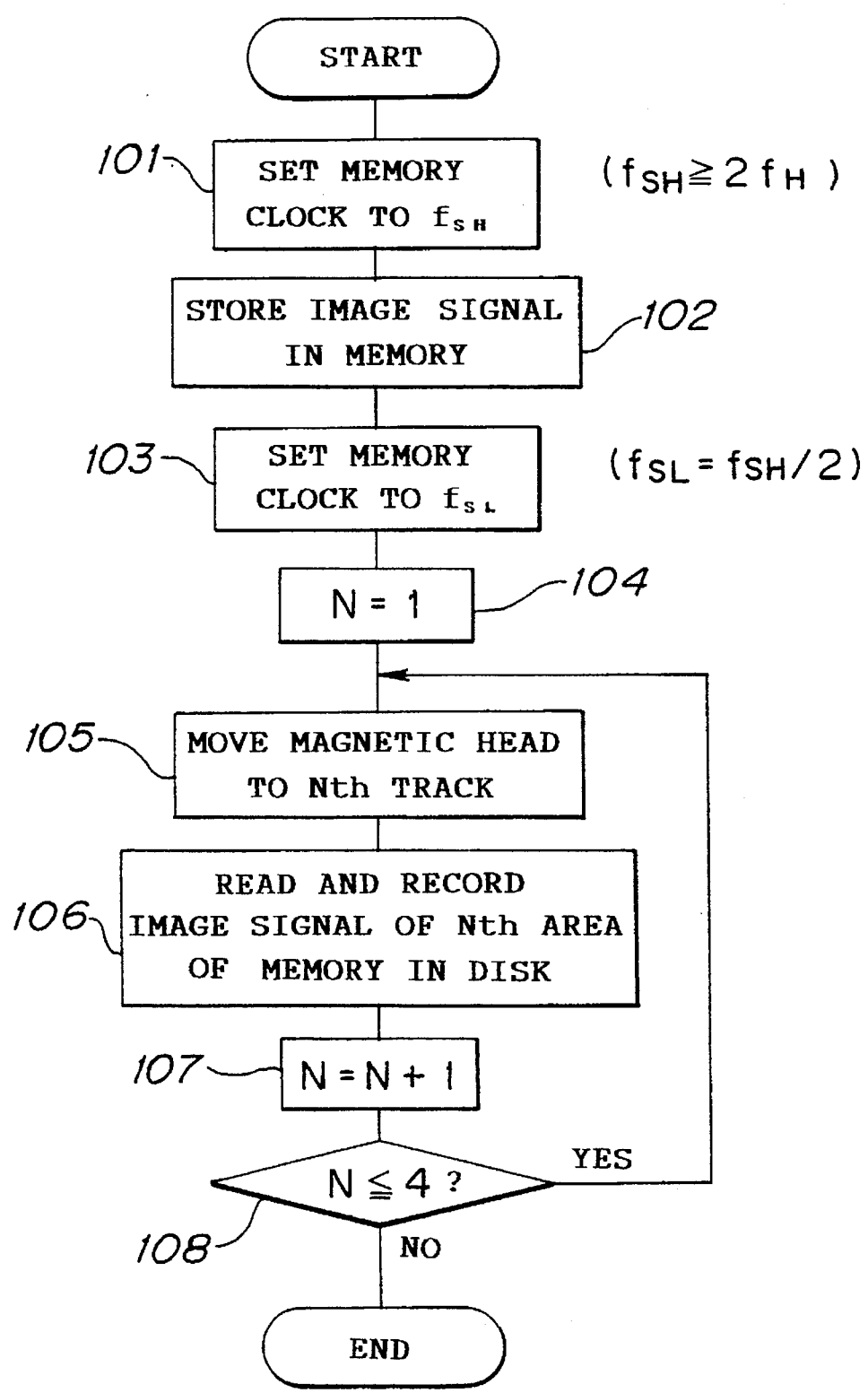
FIG. 4 is a flow chart of a program by which inputted image signals are divided into four parts and stored in memories, and then time-expanded to be stored in a magnetic disk.

FIG. 4 shows a flow chart of a program by which inputted image signals of one frame are divided into four parts and stored in memories, and are then time-expanded to be stored in the magnetic disk D.

To A/D convert inputted image signals and store them in the memories 26, 27 and 28, the inputted image signals must be sampled with a frequency of more than twice the bandwidth of the inputted image signals, according to the Nyquist theorem. Therefore, in Step 101, a sample frequency of the memory clock is set to $f_{SH}$, which is more than or equal to twice the bandwidth $f_H$ of the inputted image signals. This memory clock is generated based on the standard clock signals outputted from the synchronizing signal generating circuit 34. In Step 102, the inputted image signals are A/D converted based on this memory clock, and are stored in the memories 26, 27 and 28.

Then, in Step 103, the memory clock is set to $f_{SL}$ which is ½ of the sampling frequency $f_{SH}$ of the inputted image signals. In Steps 104 through 108, the image signals in the memories 26, 27 and 28 are D/A converted and recorded in the magnetic disk D. Namely, the image signals are twice time-expanded in comparison with the inputted image signals to be stored in the magnetic disk D.

In Step 104, a counter N is set to "1". In Step 105, the magnetic head 11 is moved to the Nth track. Then, in Step 106, the image signals stored in the Nth recording areas of the memories 26, 27 and 28 are read out with a timing of the frequency $f_{SL}$, and are recorded in the magnetic disk D. In Step 107, the counter N is incremented by "1", and in Step 108 it is determined whether the counter N is less than or equal to "4". When the counter is less than or equal to "4", since reading out of all of the image signals stored in all of the recording areas of the memories 26, 27 and 28 has not been completed, the process of steps 105–108 is again executed. Conversely, when the counter N is higher than "4", all of the image signals stored in all of the recording areas of the memories 26, 27 and 28 have been read out, and therefore, the program ends.

Figure 5:
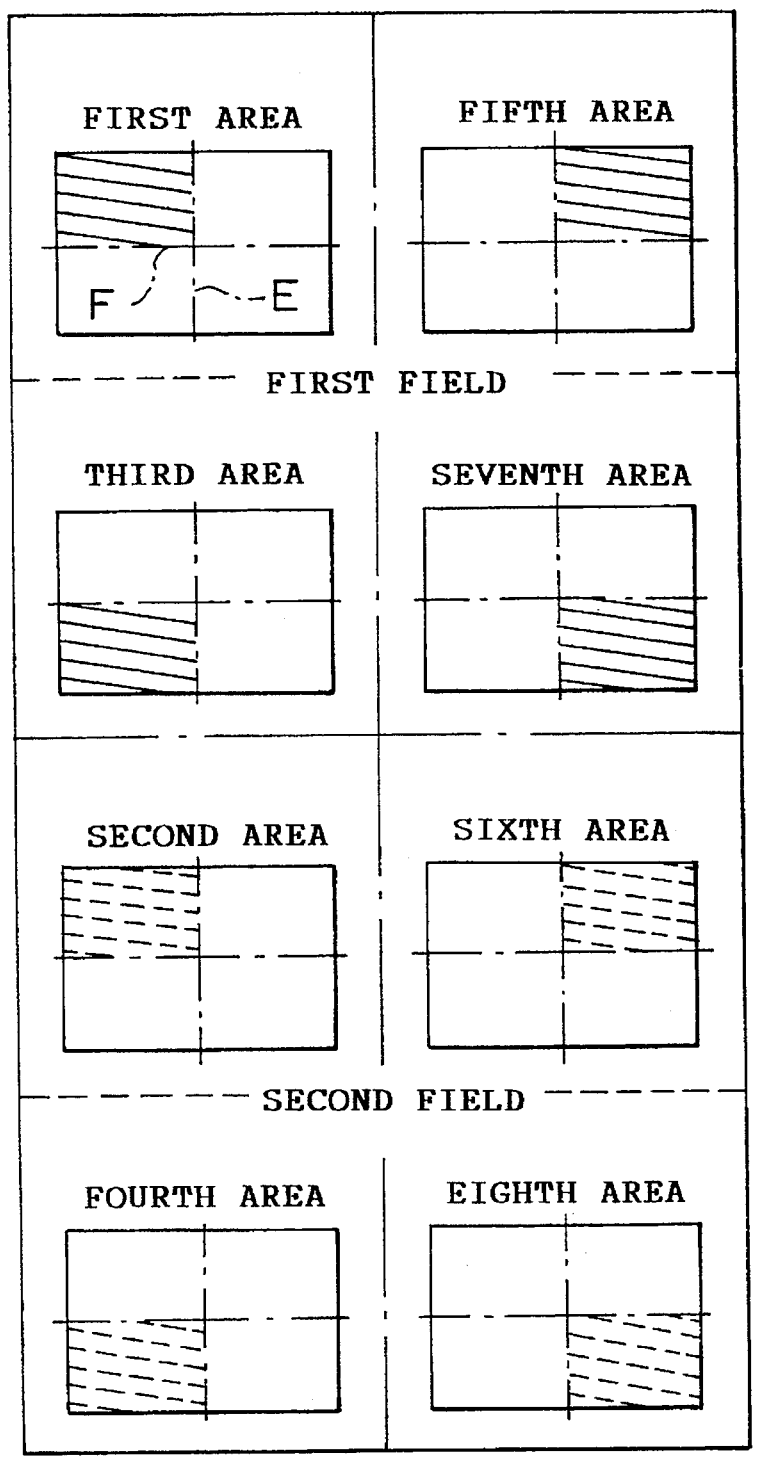
FIG. 5 is a diagram schematically showing a record example of image signals in memories in another embodiment.

FIG. 5 schematically shows a record example of image signals in the memories 26, 27 and 28 in a second embodiment. In this drawing, the image signals are recorded in a frame record mode, and the number of scanning lines of the inputted image signals and the line frequency (horizontal scanning frequency) of the inputted image signals are determined according to the HDTV (High Definition TV) of the high vision system, which are different from the still video format. Namely, one frame is composed of a first field and a second field, and as shown in the drawing, the scanning lines shown by solid lines denote the first field and the scanning lines shown by broken lines denote the second field. The frame is divided into four parts by a center line E extending in a vertical direction and passing through the center of the frame, and a center line F extending in a horizontal direction and passing through the center of the frame.

The image signals corresponding to a left and upper side frame of the first field are stored in a first recording area of the memory; the image signals corresponding to a left and lower side frame of the first field are stored in a third recording area of the memory; the image signals corresponding to a right and upper side frame of the first field are stored in a fifth recording area of the memory; and the image signals corresponding to a right and lower side frame of the first field are stored in a seventh recording area of the memory. Further, the image signals corresponding to a left and upper side frame of the second field are stored in a second recording area of the memory; the image signals corresponding to a left and lower side frame of the second field are stored in a fourth recording area of the memory; the image signals corresponding to a right and upper side frame of the second field are stored in a sixth recording area of the memory; and the image signals corresponding to a right and lower side frame of the second field are stored in a eighth recording area of the memory. The image signals stored in the first through the eighth recording areas are recorded in first through eighth tracks of the magnetic disk D. When the magnetic disk D in which image signals are recorded in the manner described above is reproduced in the frame reproduction mode by a conventional still video device, a quarter part of one frame can be reproduced as a high definition image.

Figure 6:
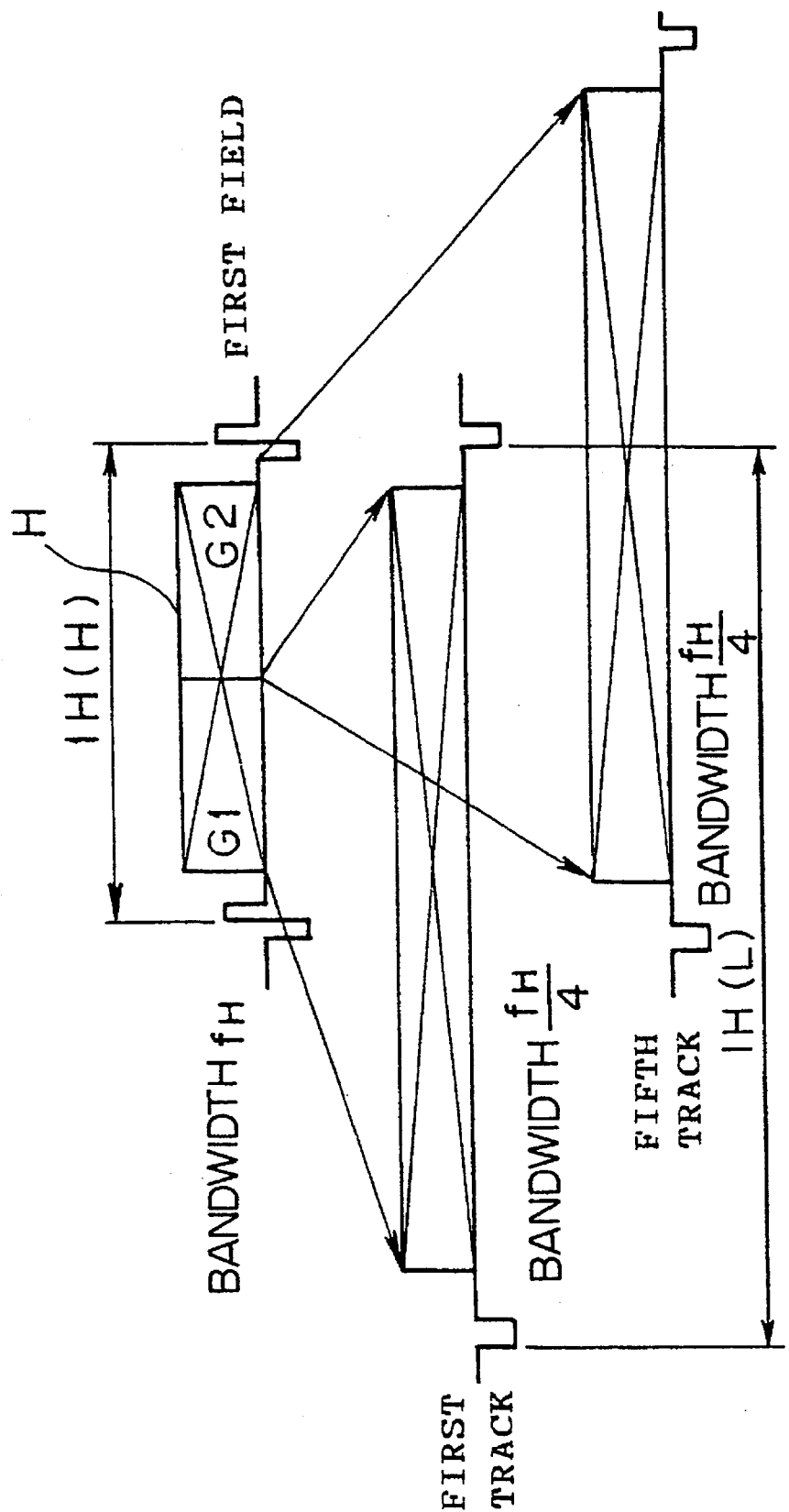
FIG. 6 is a diagram showing a relationship between image signals inputted to the still video device and image signals stored in the magnetic disk in another embodiment.

FIG. 6 shows a relationship between image signals inputted to the still video device and image signals stored in the magnetic disk D. A horizontal scanning line H of the inputted image signal is composed of the image signals G1 and G2; the image signal G1 corresponding to a left half of the frame, and the image signal G2 corresponding to a right half of the frame. These image signals G1 and G2 are recorded in different tracks of the magnetic disk D. Namely, the image signals corresponding to an upper portion of the first field, for example, are recorded in the first and the fifth tracks, respectively, but the bandwidths of the image signals inputted to the still video device are $f_H$, and when the image signals are read out from the memories 26, 27 and 28, the image signal is time-expanded four times. Therefore, the bandwidths of the image signals recorded in the magnetic disk D are $f_H/4$.

As described above, the embodiment is constructed in such a manner that image signals of one frame are divided into eight parts to be stored in the memories, and then time-expanded four times to be read out from the memories. Accordingly, even when the inputted image signals have been formed according to the HDTV system, the contents of the image signals can be stored in the magnetic disk D as they are. Therefore, the image signals can be recorded in the magnetic disk while maintaining the high quality thereof.

Figure 7:
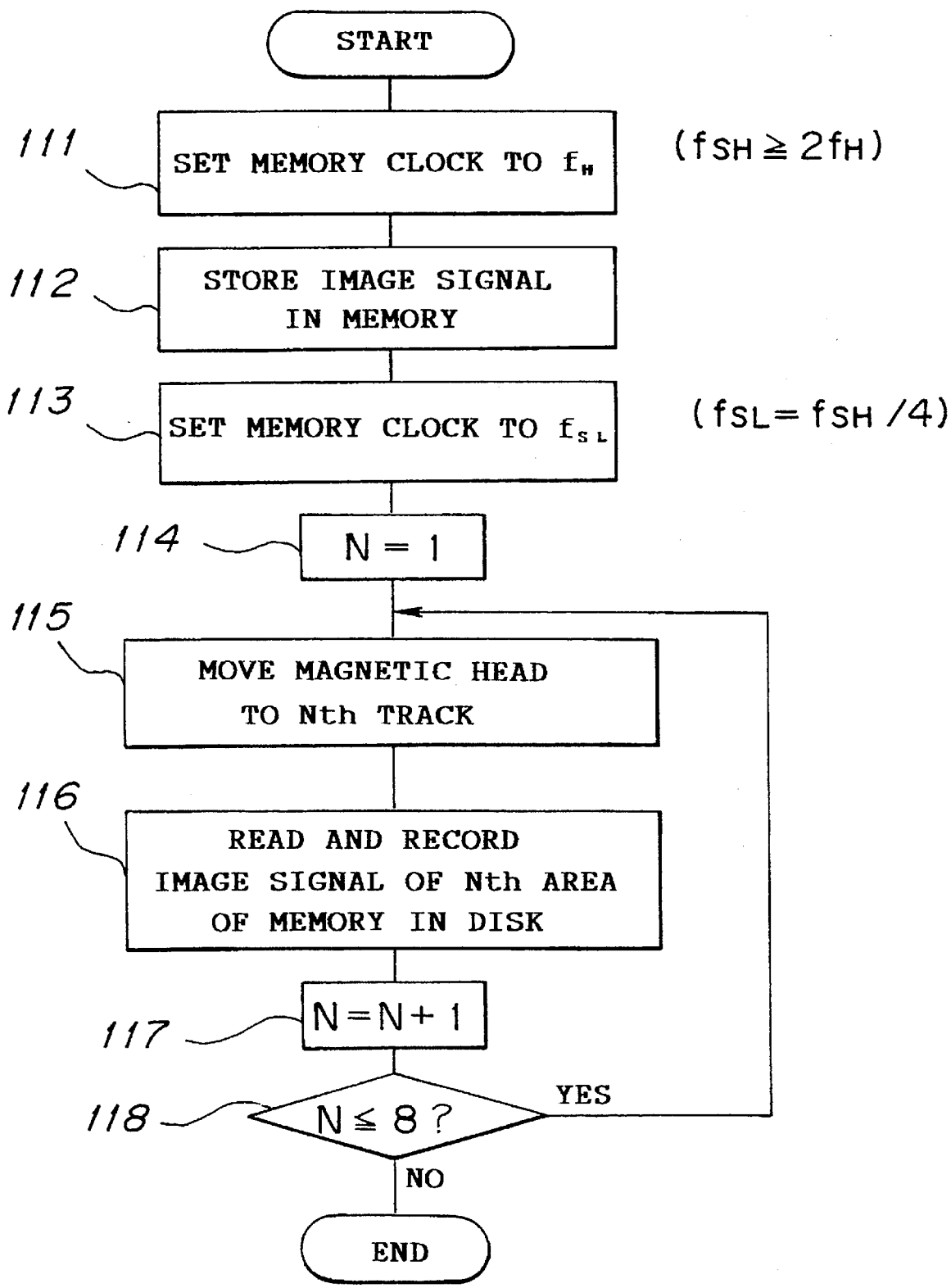
FIG. 7 is a flow chart of a program by which inputted image signals of one frame are divided into eight parts and stored in memories, and then are time-expanded to be stored in a magnetic disk.

FIG. 7 shows a flow chart of a program by which inputted image signals of one frame are divided into eight parts and stored in memories, and then are time-expanded to be stored in the magnetic disk D. This flow chart is basically the same as that of FIG. 4, and each of the Steps corresponds to the other. In FIG. 7, the Step reference is shown such that "10" is added to that of the corresponding Step of FIG. 4.

Only Steps in which the content of process is different are described below. Namely, in Step 113, the memory clock is set to $f_{SL}$ which is ¼ of the sampling frequency $f_{SH}$ of the inputted image signals. This is because the image signals stored in the memories 26, 27 and 28 are time-expanded four times to be recorded in the magnetic disk D. In Step 118, it is determined whether the counter N is less than or equal to "8". This is because the image signals are stored in eight recording areas of each of the memories 26, 27 and 28.

Figure 8:
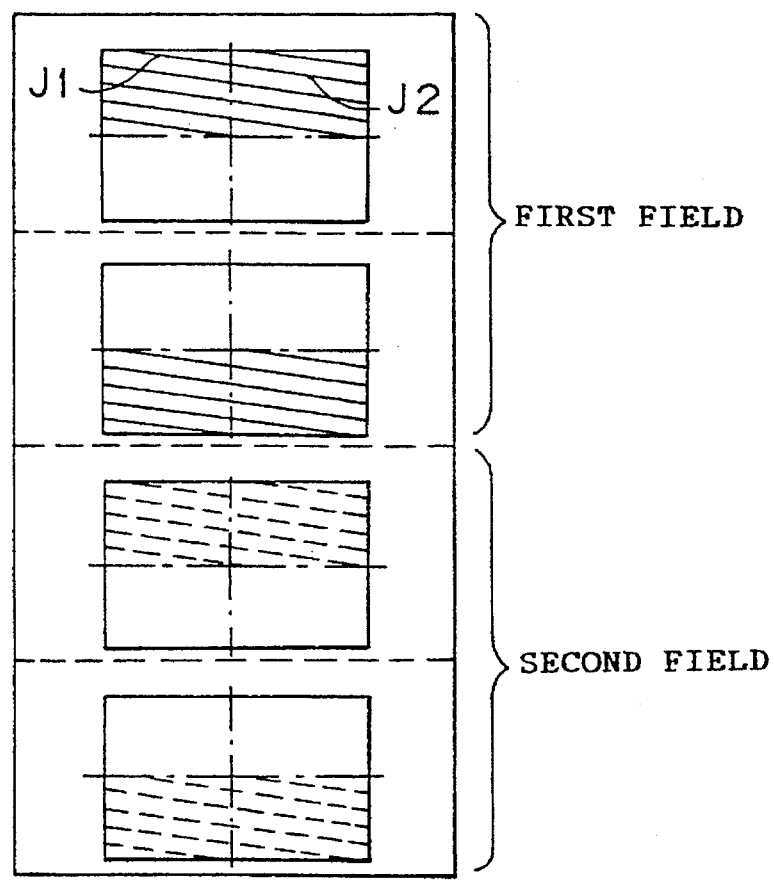
FIG. 8 is a diagram schematically showing a record example of image signals in memories in still another embodiment.

FIG. 8 schematically shows a record example of image signals in the memories 26, 27 and 28 in a third embodiment. The frame is divided into two parts by a center line extending in a horizontal direction and passing through the center thereof. Compared to the embodiment shown in FIG. 2, image signals stored in each of the recording areas are different from those of this embodiment. Namely, image signals corresponding to an upper half frame of the first field are stored in a first recording area of the memory; image signals corresponding to a lower half frame of the first field are stored in a second recording area of the memory; image signals corresponding to an upper half frame of the second field are stored in a third recording area of the memory; and image signals corresponding to a lower half frame of the second field are stored in a fourth recording area of the memory.

Figure 9:
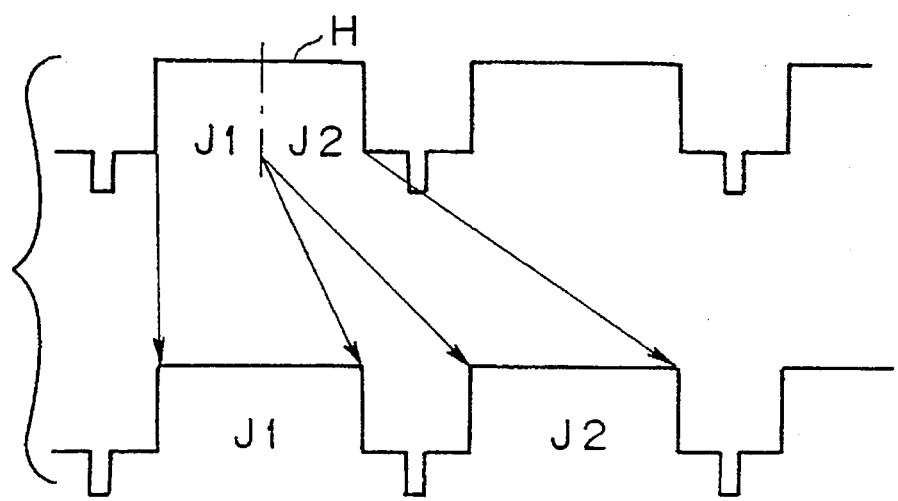
FIG. 9 is a diagram showing a relationship between image signals inputted to the still video device and image signals stored in the magnetic disk in the still another embodiment.

FIG. 9 shows a relationship between image signals inputted to the still video device and image signals stored in the magnetic disk D in the embodiment. A horizontal scanning line H of the inputted image signal is composed of the image signals J1 and J2; image signal J1 corresponding to a left half of the frame and the image signal J2 corresponding to a right half of the frame. These image signals J1 and J2 are recorded in different tracks of the magnetic disk D. Namely, the image signals J1 and J2 are recorded in different parts of the same track of the magnetic disk D. Further, the bandwidths of the image signals inputted to the still video device are $f_H$, and when the image signals are read out from the memories 26, 27 and 28, the image signals are time-expanded two times. Therefore, the bandwidths of the image signals recorded in the magnetic disk D are $f_H/2$.

In the third embodiment shown in FIGS. 8 and 9, when a track storing image signals of a first recording area and a track storing image signals of a second recording area, for example, when such image signals recorded in the magnetic disk D are reproduced by a conventional reproducing device, a horizontal scanning line of the upper half of the frame and a horizontal scaning line of the lower half of the frame are alternately indicated, and the left and the right frame are different from each other at every scanning line. Namely, a normal image cannot be obtained by the conventional still video device. To obtain a normal image, a method by which the image signals can be read out from the memories must be determined, so that a predetermined turning of the scanning lines is attained.

In the above embodiments, since a plurality of tracks of the magnetic disk D are used for one frame, if a plurality of magnetic heads are used for recording the image signals to the magnetic disk D, the number of movements of the magnetic head when recording the image signals to each track is reduced, whereby the efficiency of the recording operation of the image signals is improved.

FIGS. 10 through 13 show a fourth embodiment in which image signals inputted to the still video device are subsampled and recorded in the magnetic disk D. Note that, in this embodiment, the inputted image signals are recorded in the magnetic disk D in the frame recording mode, and the number of scanning lines and the line frequency of the inputted image signal are determined according to the HDTV and so on.

Figure 10:
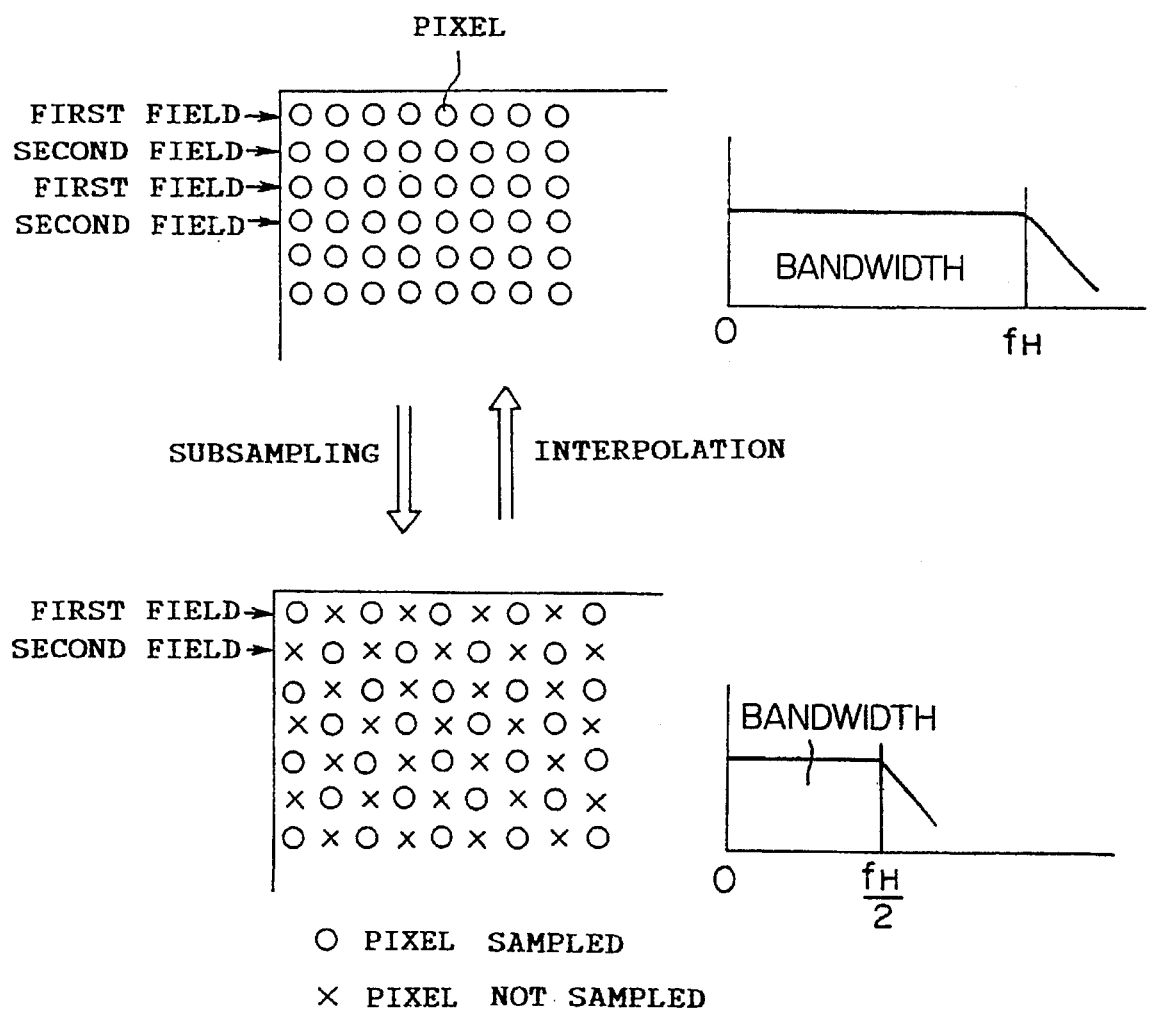
FIG. 10 is a diagram showing a relationship between a subsampling and an interpolation.

FIG. 10 shows a relationship between a subsampling and an interpolation. In this drawing, a bandwidth of the inputted image signals is $f_H$, and the image signals are stored in the memories 26, 27 and 28 after a half of the pixels of the image signals have been subsampled. Further, when reproducing the image signals, the image signals are interpolated by a known method, so that the subsampled pixels substantially reappear. Thus image signals having almost the same quality as the inputted image signals are obtained.

In FIG. 10, with respect to the pixels of the first field, the leftmost pixel of the frame is sampled and the pixel positioned next the leftmost pixel is thinned out. The same operation is applied successively such that the sampling is carried out at every other pixel. Conversely, regarding pixels of the second field, the leftmost pixel of the frame is thinned out and the pixel positioned next the leftmost pixel is sampled. Again, the same operation applied successively such that the sampling is carried out at every other pixel. Accordingly, pixels of the inputted image signals are subsampled uniformly over the frame.

Figure 11:
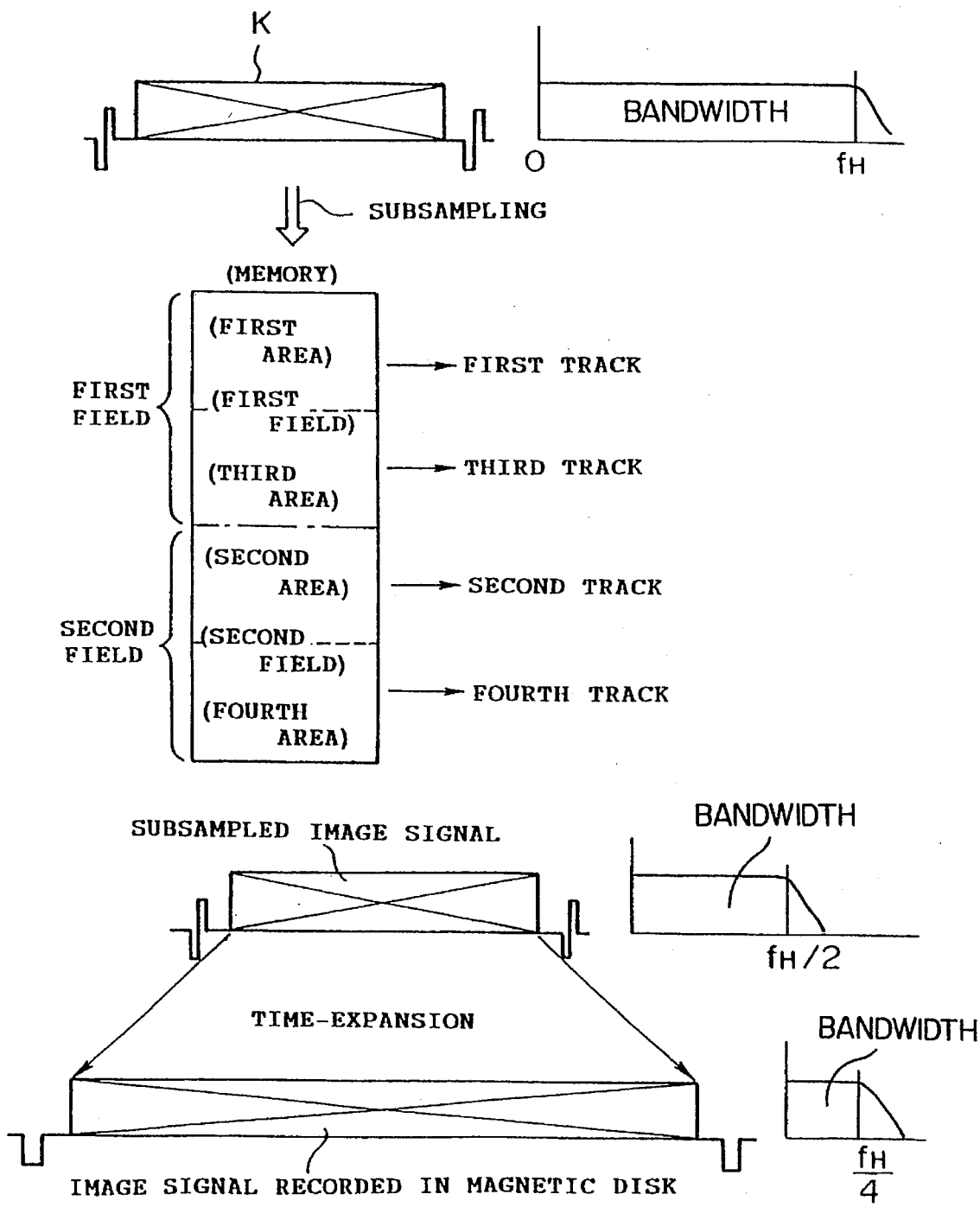
FIG. 11 is a diagram showing a relationship among inputted image signals, image signals recorded in memories, and image signals recorded in a magnetic disk.

FIG. 11 shows a relationship among inputted image signals, image signals recorded in the memories, and image signals recorded in the magnetic disk D. The inputted image signal corresponds to one horizontal scanning line. In this drawing, although a bandwidth of the inputted image signal K is $f_H$, image signals stored in the memories are subsampled, so that a bandwidth of the image signals become $f_H/2$. Image signals of a first field and image signals of a second field are divided and stored in a first recording area through a fourth recording area of the memories 26, 27 and 28, respectively. Namely, image signals corresponding to an upper frame of the first field are stored in the first recording area of the memories; image signals corresponding to a lower frame of the first field are stored in the third recording area of the memories; image signals corresponding to an upper frame of the second field are stored in the second recording area of the memories; and image signals corresponding to a lower frame of the second field are stored in the fourth recording area of the memories. The image signals stored in the first through fourth recording areas are recorded in the first through fourth tracks of the magnetic disk D.

The image signals stored in the memories are time-expanded two times when recorded in the magnetic disk D, whereby the bandwidth of the image signal becomes $f_H/4$. Therefore, even if the inputted image signals have been formed according to the HDTV system, the image signals can be recorded in the magnetic disk D by the still video device while maintaining the high quality thereof.

Figure 12:
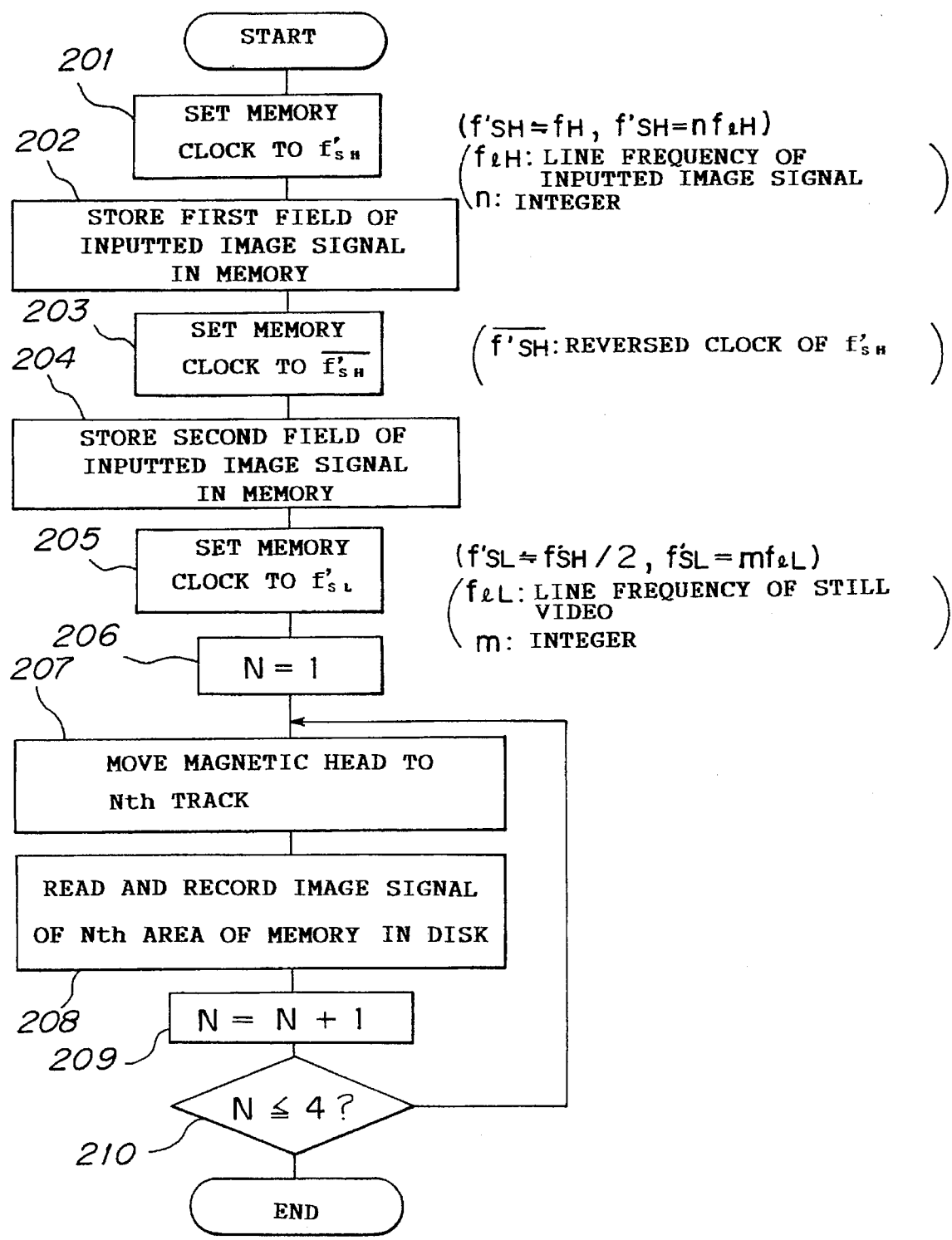
FIG. 12 is a flow chart of a program by which inputted image signals of one frame are divided into two parts and subsampled to be recorded in the magnetic disk.

FIG. 12 shows a flow chart of a program by which inputted image signals of one frame are divided into two parts and subsampled to be recorded in the magnetic disk D, as shown in FIG. 11.

In Step 201, a frequency of a memory clock is set to $f_{SH}$, which is approximately equal to a bandwidth $f_H$ of the inputted image signals. This memory clock is equal to an integer times the horizontal line frequency of the inputted image signals, and is generated based on the standard clock signals outputted from the synchronizing signal generating circuit 34. The reason why the frequency of the memory clock is set to the integer times horizontal line frequency of the inputted image signals is that the clock signal is raised at the left end of the frame. Accordingly, regarding the first field, odd numbered pixels counted from the left end of the frame are sampled, as described later. In Step 202, the first field of inputted image signals is A/D converted based on this memory clock, and stored in the memories 26, 27 and 28.

Then, in Step 203, the memory clock is reversed. A time when the memory clock is raised and a time when the memory clock is dropped are equal to each other. Therefore, due to Step 203, clock signals offset by a half period to the memory clock set in Step 201 are generated. In Step 204, based on the memory clock set in Step 204, the second field of the inputted image signals is A/D converted to be stored in the memories 26, 27 and 28.

Figure 13:
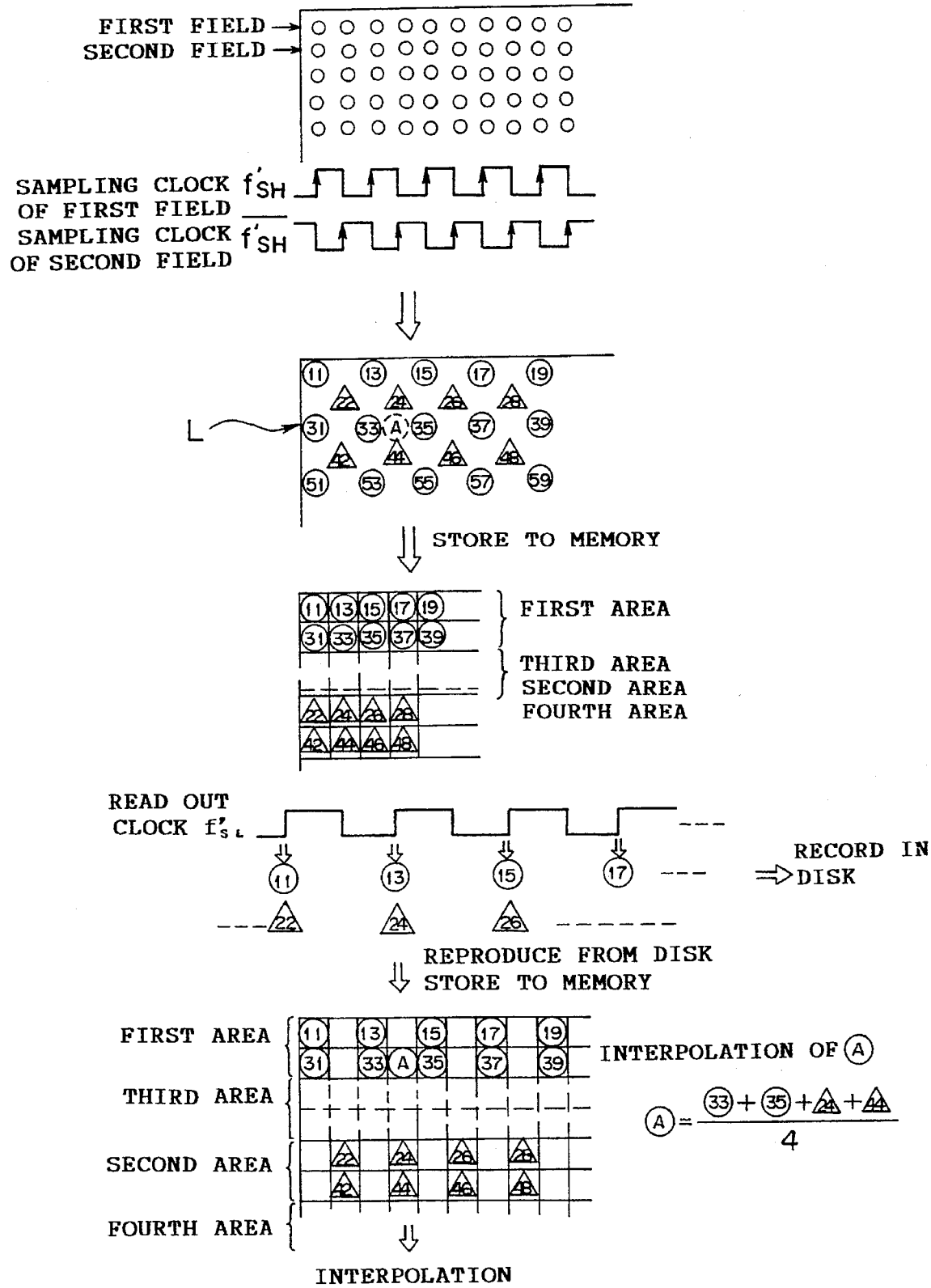
FIG. 13 is a diagram showing an operation in which image signals recorded in the magnetic disk by subsampling are read from the magnetic disk.

With reference to FIG. 13, an operation in which the image signals are stored in the memories in Steps 202 and 204 is described below.

A sampling of pixels of the image signals is carried out by raising the clock signal. Therefore, as shown by reference L, in the first field, the odd numbered pixels counted from the left end of the drawing are sampled, and in the second field the even numbered pixels counted from the left end of the drawing are sampled. The pixels of the first field sampled by this operation are stored in the first and third recording areas of the memories, and the pixels of the second field sampled by this operation are stored in the second and fourth recording areas.

In Step 205, the memory clock is set to frequency $f_{SL}$. Frequency $f_{SL}$ is half of frequency $f_{SH}$, which is provided for storing the inputted image signals to the memories, and is an integer times the line frequency of the still video. The reason why the frequency of the memory clock is set to an integer times the line frequency of the still video is that, in the magnetic disk, the relative positions of the synchronizing signal and the image signal are exactly aligned with each other.

In Step 206, a counter N is set to "1". In Step 207, the magnetic head 11 is moved to the Nth track, and in Step 208 the image signals stored in the Nth recording areas of the memories 26, 27 and 28 are read out with a timing of the frequency $f_{SL}$, and recorded in the magnetic disk D. In Step 209, the counter N is incremented by "1", and in Step 210 it is determined whether the counter N is less than or equal to "4". When the counter is less than or equal to "4", since the reading out of all of the image signals stored in all of the recording areas of the memories 26, 27 and 28 has not been completed, Steps 207–209 are again executed. Conversely, when the counter N is higher than "4", the image signals stored in all of the recording areas of the memories 26, 27 and 28 have been read out. Therefore, the program ends.

An operation in which image signals recorded in the magnetic disk by subsampling are read from the magnetic disk is decribed below with reference to FIG. 13.

As described above, when the image signals are read from the magnetic disk, the image signals are interpolated. Pixels obtained by this interpolation correspond to pixels which have been thinned out when the image signals are sampled. In the image signals shown by reference L, an interpolated pixel is shown by reference A being encircled by a broken line. The value of pixel (A) is obtained by taking the arithmetic mean of pixels positioned around pixel A and shown by references 33, 35, 24 and 44. The pixels (33, 35) positioned at the left and the right sides of pixel (A) belong to the same horizontal scanning line, and pixels (24, 44) positioned above and below pixel (A) belong to horizontal scanning lines positioned above and below the horizontal scanning line of pixel (A), respectively. Namely, pixels (24, 44) are included in a field that is different from a field in which pixels (33, 35) are included.

Thus, since the thinned out pixels are approximated by an interpolation, when the image signals recorded in the magnetic disk are reproduced, the obtained image has substantially the same resolution as the inputted image signals.

Figure 14:
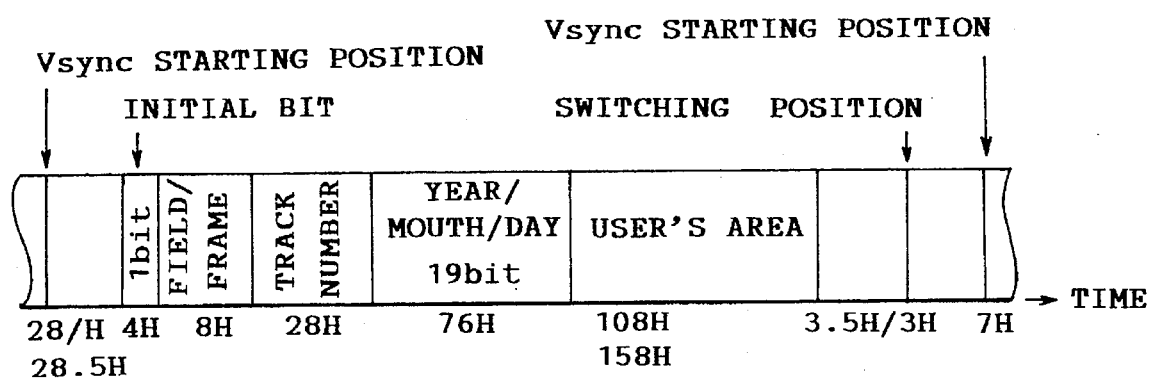
FIG. 14 is a diagram showing a track area of the magnetic disk in which ID codes are recorded.

In the magnetic disk, besides image signals, ID codes relating to the image signal are recorded; the ID codes being a recording mode, to be a photographing date, a frame division mode described later, and so on. FIG. 14 shows a track area of the magnetic disk in which the ID codes are recorded. In this drawing, "H" refers to one horizontal scanning line. The construction of the ID code is the same as that used in a conventional still video device, and is provided with a user's area. In this embodiment, information necessary for automatically carrying out operations, such as a division of a frame, a time-expansion and a reading of image signals, are recorded in the user's area.

Figure 15:
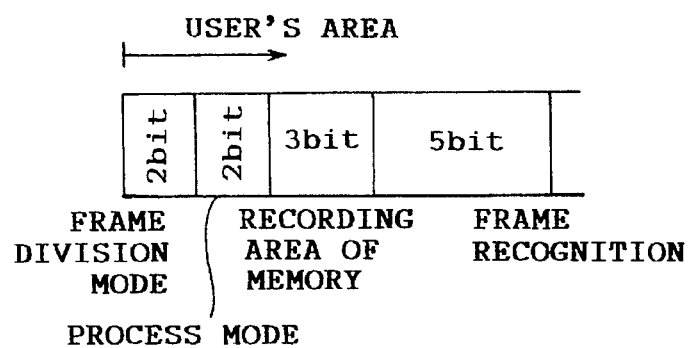
FIG. 15 is a diagram showing a general construction of a user's area of the ID codes.

FIG. 15 shows a general construction of the user's area. As shown in this drawing, 2 bits are provided to indicate the frame division mode, 2 bits indicate a processing mode, 3 bits indicate a recording area of a memory, and 5 bits a frame recognition are allocated in the user's area, respectively. This is described below with reference to FIGS. 16 through 19.

FIG. 16 shows information related to the frame division mode. "Without Division" means a mode in which image signals are recorded in a magnetic disk without dividing the frame, i.e., the same recording mode as a conventional still video device. The "without division" is indicated by the 2 bit frame division code to "00". "2 Division" means a mode in which image signals are recorded in a magnetic disk in a state in which the frame is divided into two parts by a straight line extending in a vertical direction (see FIG. 2). The "2 Division" is indicated by setting the 2 bit frame division code to "01". "4 Division" means a mode in which image signals are recorded in a magnetic disk in a state in which the frame is divided into four parts by a straight line extending in a vertical direction and a straight line extending in a horizontal direction (FIG. 5). The "4 Division" is indicated by setting the 2 bit frame division code to "10". "H2 Division" means a mode in which image signals are recorded in a magnetic disk in a state in which the frame is divided into two parts by a straight line extending in a horizontal direction (FIG. 8). The "H2 Division" is indicated by setting the 2 bit frame division code to "11".

FIG. 17 shows the processing mode, i.e., information related to a recording process mode in which image signals are recorded in the magnetic disk. "Normal" means a mode in which image signals are recorded in the magnetic disk without a time-expansion or subsampling, i.e., the same recording mode as for a conventional still video device. "Normal" is indicated by setting the 2 bit process code to "00", "Subsampling" is indicated by setting the 2 bit process code to "01". "Time-expansion" is indicated by setting the 2 bit process code to "10". "Subsampling & Time-expansion" are indicated by setting the 2 bit process code to "11".

FIG. 18 shows information related to the recording area of the memory. The information indicates to which recording areas of the divided frame the image signals stored in a track in which the ID codes are recorded belong. As shown in FIG. 5, for example, when one frame is divided into four parts and image signals are recorded in the magnetic disk in a frame mode, the first recording area through the eight recording area are indicated by setting the 3bits to "001", "010", "011", "100", "101 ", "110", "111", "000", respectively. When the frame is divided into four parts or two parts, only the information for the first recording area through the fourth recording area, or the first recording area and the second recording area are used, respectively.

FIG. 19 shows information related to the frame recognition. The information indicates to which frame the image signals recorded in a track in which the ID codes are recorded corresponds. As shown in FIG. 5, for example, when one frame is divided into four parts and image signals are recorded in the magnetic disk in a frame mode, 8 frame areas exist. Namely, in this case, there are 8 tracks in which 5 bits of information "00001", indicating the first frame, are recorded. In this embodiment, up to 32 kinds of the frame recognition information can be set, at a maximum.

The information such as the frame division mode, the processing mode, the recording area of the memory, and the frame recognition is DPSK-modulated by the ID record processing circuit 37, and then recorded in the magnetic disk D. As described later, this information is DPSK-demodulated to be read from the magnetic disk, and decoded to be used for reproducing the image.

Figure 20:
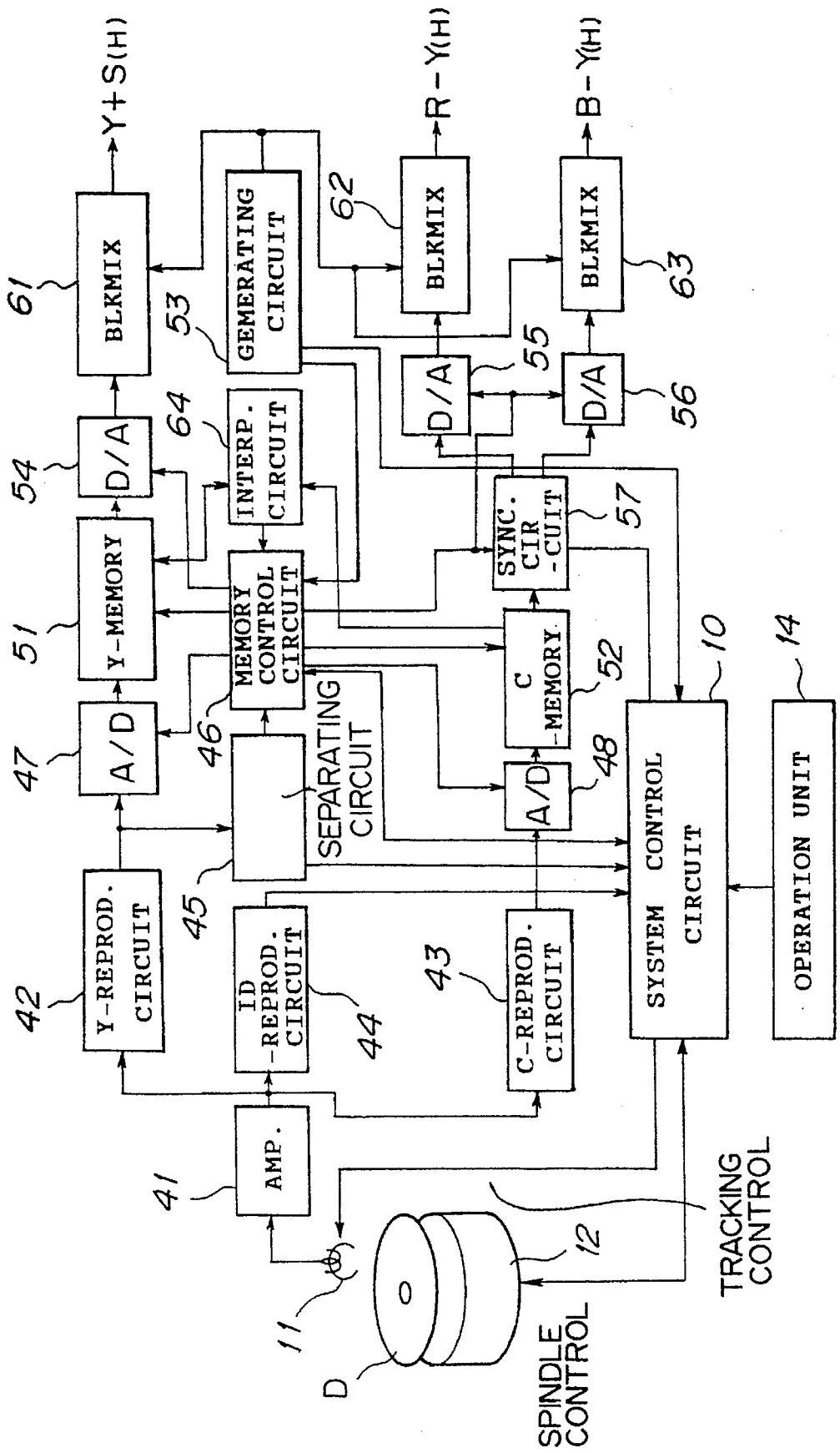
FIG. 20 is a block diagram of a reproducing system of the still video device.

FIG. 20 shows a block diagram of a reproducing system of the still video device.

The system control circuit 10, the magnetic head 11, the spindle motor 12 and the operation unit 14 are also included in the recording system shown in FIG. 1; i.e., are provided for the recording system and the reproducing system.

The magnetic head 11 is positioned at a predetermined track of the magnetic disk D, so that ID codes and image signals recorded in the track are reproduced. A reproducing amplifier 41 reads the image signals and the ID codes recorded in the magnetic disk D, and outputs the same to a Y-reproduction process circuit 42, a C-reproduction process circuit 43, and an ID-reproduction process circuit 44. The Y-reproduction process circuit 42 frequency-demodulates and outputs luminance signals (Y+S) including horizontal synchronizing signals. The C-reproduction process circuit 43 frequency-demodulates and outputs an R–Y and a B–Y differential color signal. The ID-reproduction process circuit 44 DPSK-demodulates and outputs the ID codes.

A horizontal synchronizing signal S included in the luminance signal (Y+S) is separated from the luminance signal (Y+S) by a synchronizing signal separating circuit 45, and transmitted to a memory control circuit 46 and the system control circuit 10. The memory control circuit 46 controls A/D converters 47, 48, a Y-memory 51 and a C-memory 52, based on the hotizontal synchronizing signal S. Further, the memory control circuit 46 controls D/A converters 54, 55, 56, the Y-memory 51 and the C-memory 52, based on a synchronizing signal outputted from a synchronizing signal generating circuit 53 described later.

The luminance signals (Y+S) including the horizontal synchronizing signals are A/D converted by the A/D converter 47, and the luminance signal Y recorded between two horizontal synchronizing signals stored in the Y-memory 51 under the control of the memory control circuit 46. The luminance signal Y stored in the Y-memory 51 is D/A converted by the D/A converter 54, based on a synchronizing signal (a standard clock signal) outputted from the synchronizing signal generating circuit 53.

Similarly, the R–Y and the B–Y differential color signal are A/D converted by the A/D converter 48, and stored in the C-memory 52. The R–Y and the B–Y differential color signal are alternately outputted from the C-memory 52, based on the standard clock signal, and the R–Y and the B–Y differential color signal formed on the same horizontal scanning line as each other are simultaneously outputted from a synchronization circuit 57, by an operation of the memory control circuit 46. The signals outputted from the synchronization circuit 57 are inputted to D/A converters 55 and 56 and are D/A converted.

The standard clock signal used for reading image signals from the Y-memory 51 and the C-memory 52 has a frequency having a value which is twice, for example, that of the standard clock signal used for recording image signals to the Y-memory 51 and the C-memory 52. Therefore, the image signals are read from the memories 51 and 52 at a relatively high speed, whereby the image signals are time-compressed.

Blanking sync mix circuits 61, 62 and 63 are provided for setting a predetermined portion in front of the R–Y and the B–Y differential color signal to a zero level, and superimposing a synchronizing signal on that portion. Accordingly, by an operation of the blanking sync mix circuits 61, 62 and 63, a clear synchronizing signal which is conformed with a system such as the HDTV system is supplemented to a portion in front of these differential color signals. Each of the signals (Y+S), (R–Y) and (B–Y) outputted from the blanking sync mix circuits 61, 62 and 63 are inputted to a display device, not shown.

An interpolation process circuit 64 is provided for carrying out an interpolation described above with reference to FIG. 13. Namely, the interpolation process circuit 64 calculates, in accordance with the luminances and differential colors of pixels positioned around the pixel that will reappear, a luminance and differential color of the pixel made to reappear by an interpolation.

Further, ID codes stored in the magnetic disk D are subjected to a process such as a DPSK-demodulation in the ID-reproduction process circuit 44, and then decoded by the system control circuit 10. Accordingly, the system control circuit 10 recognizes information, such as the frame division mode, so that a predetermined image is reproduced in accordance with image signals of the divided frame areas.

Figure 21:
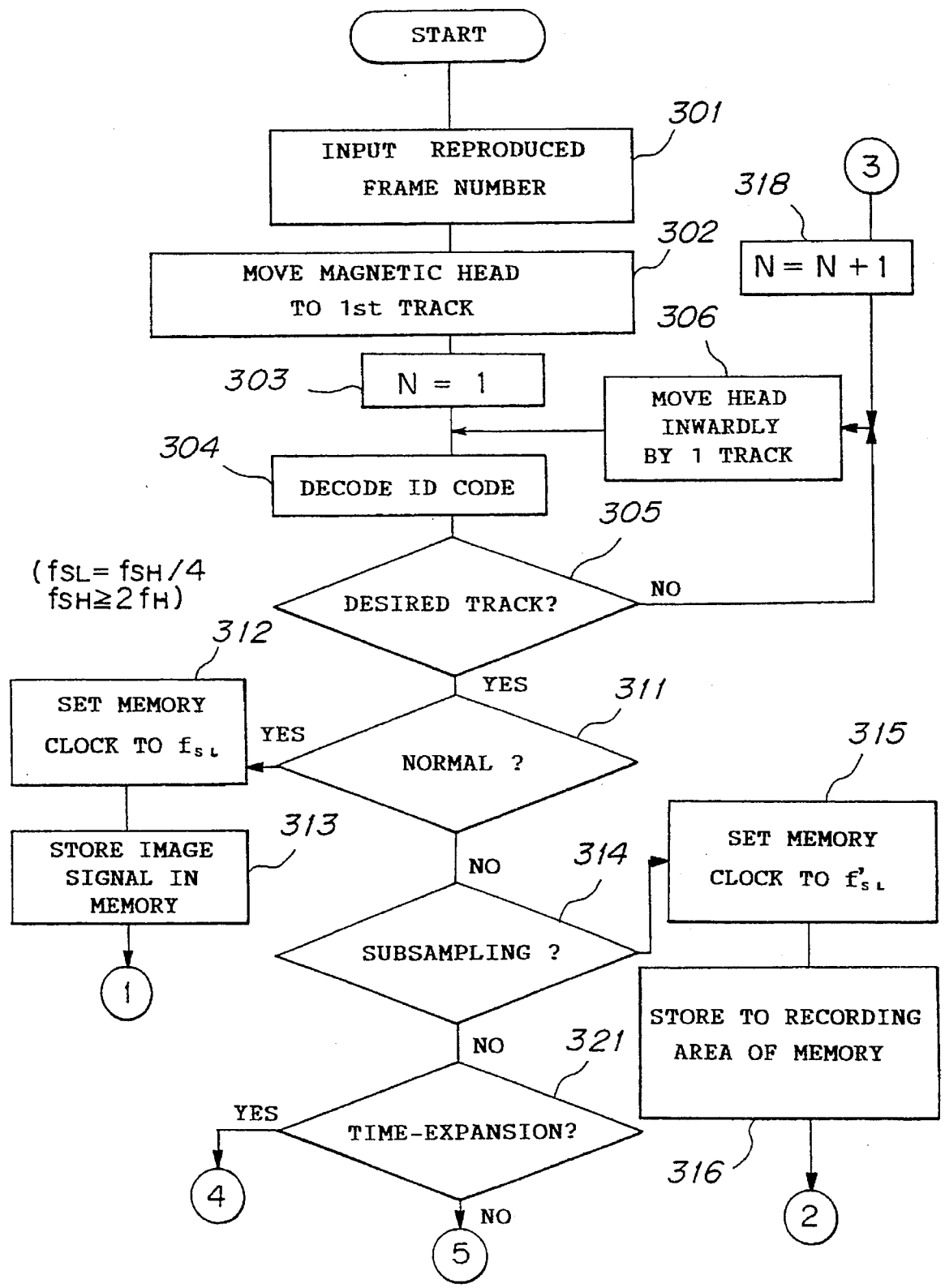
FIG. 21 is a first part of a flow chart of a program by which a magnetic disk D, in which image signals are divided with respect to a frame and recorded with a time-expansion or a subsampling, is reproduced.
Figure 22:
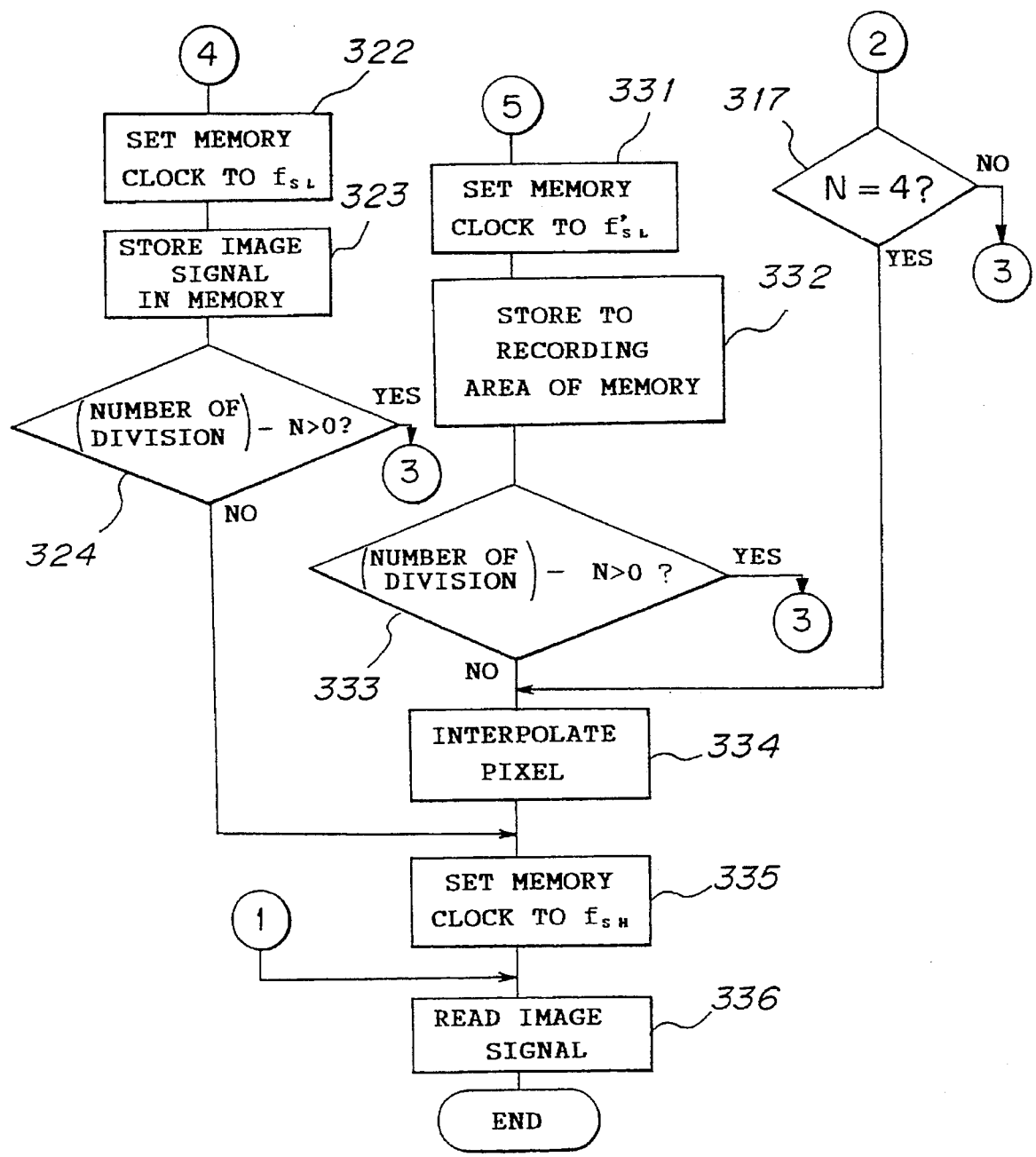
FIG. 22 is a second part of the flow chart of FIG. 21.

FIGS. 21 and 22 show a flow chart of a program by which a magnetic disk D, in which image signals are divided with respect to a frame and recorded with a time-expansion or a subsampling, is reproduced.

In Step 301, the reproducing frame number, i.e., the number of the frame to be reproduced, is inputted from the operation unit 14. The reproduced frame number corresponds to the number of the first frame, the second frame and so on in the frame recognition shown in FIG. 19. In Step 302, the magnetic head 11 is moved to and positioned at the first track, i.e., the outermost track of the magnetic disk D, and in Step 303 the counter N is set to "1".

In Step 304, the ID codes of the first track are decoded, and in Step 305, based on the contents of the ID codes, it is determined whether the track corresponds to the desired image selected in Step 301. When this track does not correspond to the desired image, the magnetic head 11 is moved inwardly by one track in Step 306. Then, Steps 304 and 305 are repeatedly carried out until the desired track is found.

When the track storing the desired image is found, the process goes from Step 305 to Step 311, and it is determined whether the processing mode (see FIG. 17) is "Normal", i.e., whether the frame is divided. When the processing mode is "Normal", i.e., when the frame is not divided, the memory clock is set to the frequency $f_{SL}$ in Step 312. This frequency $f_{SL}$ is a quarter of the frequency $f_{SH}$ of the clock signal used when storing the inputted image signals in the memories 26, 27 and 28 (FIG. 1), and this frequency $f_{SH}$ for storing the image signals is more than or equal to twice the bandwidth $f_H$ of the inputted image signals, as described above. In Step 313, based on the memory clock of the frequency $f_{SL}$, the image signals are A/D converted, and stored in the Y-memory 51 and the C-memory 52. Then, in Step 336, the image signals stored in the memories 51 and 52 are sequentially read out and indicated on a display device, not shown.

When it is determined in Step 311 that the processing mode is not "Normal", it is determined in Step 314 whether the processing mode (FIG. 17) is "Subsampling". When the processing mode is "Subsampling", the process goes to Step 315 in which the memory clock is set to $f'_{SL}$. This frequency $f'_{SL}$ is approximately a half of the bandwidth $f_H$ of the inputted image signals (see FIG. 12). In Step 316, the image signals are A/D converted based on the memory clock of the frequency $f'_{SL}$, and are stored in a predetermined recording areas of the Y-memory 51 and the C-memory 52. At this time, image signals stored in an odd number recording area (the first recording area, the third recording area and so on) are stored in an odd number row of the memories 51 and 52, and image signals stored in an even number recording area (the second recording area, the fourth recording area and so on) are stored in an even number row of the memories 51 and 52. As a result, the image signals on the memories 51 and 52 are stored, as shown in a bottom part of FIG. 13, in such a manner that pixels belonging to odd number recording areas are stored in an odd number row counted from the left end of the frame, and the pixels belonging to even number recording areas are stored in an even number row counted from the left end of the frame.

Then, in Step 317, it is determined whether counter N is equal to "4". When one frame is divided into two parts and image signals are recorded in the magnetic disk in the frame recording mode, four recording areas are used for one frame in the subsampling, as shown in FIG. 11. Therefore, when counter N has not reached "N", since the storing of image signals of one frame to the memories 51 and 52 has not been completed, counter N is incremented by one in Step 318 and the magnetic head 11 is moved inwardly by one track in Step 306. Then, Steps 304 and 305 are executed, and thereafter Steps 311, 314, 315 and 316 are executed for the desired image, whereby the image signals are stored in predetermined recording areas of the memories.

When it is determined that the counter N is equal to "4", in Step 317, since the storing of image signals of one frame to the memories 51 and 52 is complete, Step 334 and following Steps are executed, and the image is indicated on the display device. First, in Step 334, pixels thinned out from the memories are interpolated by pixels positioned around the thinned out pixel (see FIG. 13). In Step 335, the memory clock is set to the frequency $f_{SH}$. Frequency $f_{SH}$ is twice frequency $f'_{SH}$ with which inputted image signals are subsampled, i.e., $f_{SH}=2f'_{SH}$. Then, in Step 336, the image signals stored in the memories 51 and 52 are sequentially read and outputted to the display device.

When it is determined in Step 314 that the processing mode is not "Subsampling", Step 321 is executed, and thus it is determined whether the processing mode is "Time-expansion". When the processing mode is "Time-expansion", the process goes to Step 322, in which the memory clock is set to frequency $f_{SL}$, which is the same as that set in Step 312. In Step 323, the image signals are stored in the memories 51 and 52 based on frequency $f_{SL}$, and then, in Step 324, it is determined whether the difference between the number of divisions of a frame and the counter N is larger than "0". When the number of divisions is larger than the counter N, since all of the image signals have not been stored in the memories 51 and 52 yet, the process for reading out the remaining image signals from the megnetic disk is carried out. Namely, in Step 318, the counter is incremented by one, and then Steps 306, 304, 305, 311, 314, 321, 322 and 323 are again executed. Thus the remaining image signals are stored in the memories 51 and 52 according to the same process as described above.

When it is determined in Step 324 that the number of divisions is smaller than the counter N, since the storing of the image signals of one frame to the memories 51 and 52 has finished, Steps 335 and 336 are executed and the image is indicated on the display device.

When it is determined in Step 321 that the processing mode is not "Time-expansion", the process mode is "Subsampling & Time-expansion" (FIG. 17). In this case, in Step 331, the memory clock is set to $f_{SL}$, which is approximately a half of the bandwidth $f_H$ of the inputted image signals (see FIG. 12). Then, in Step 332, the image signals are A/D converted, based on the memory clock of the frequency $f_{SL}$, and are stored in predetermined recording areas of the Y-memory 51 and the C-memory 52. At this time, similarly to Step 316, image signals stored in an odd number recording area are stored in an odd number row of the memories 51 and 52, and image signals stored in an even number recording area are stored in an even number row of the memories 51 and 52.

In Step 333, it is determined whether the difference between the number of divisions of a frame and the counter N is larger than 0. Thus a process similar to Step 324 is executed. Namely, when the number of division is larger than counter N, Steps 318, 306, 304, 305, 311, 314, 321, 331 and 332 are executed, and thus, the remaining image signals are stored in the memories 51 and 52. When it is determined in Step 333 that the number of division is smaller than counter N, since the storing operation of the image signals of one frame to the memories 51 and 52 is finished, Steps 334 through 336 are executed and the image is indicated on the display device.

In the above embodiments, the reproduction process is carried out based on the information related to a process of reading out the frame division, the time-expansion and the image signals recorded in the user's area of the ID codes. Means for changing the information to voluntary values may be provided, so that the reproduction process is carried out according to the changing means.

As described above, according to the still video device of the above embodiments, image signals having a higher quality can be recorded in a recording medium, and can be reproduced from the recording medium, in comparison with a conventional still video device. Further, when image signals recorded in a magnetic disk by a conventional still video device are reproduced by the above embodiment still video device, a pluarlity of images are outputted on one frame, i.e., a multi-image indication can be obtained. Still further, when a magnetic disk in which image signals are recorded in a recording mode of the embodiment is reproduced by a conventional still video device, a part of one frame can be reproduced as a high definition image.

Further, when image signals recorded in a magnetic disk are reproduced, the sampling of the image signals must by carried out at a timing with a high accuracy. Therefore, if jitter occurs in a synchronizing signal, or if a wave shape of a synchronizing signal is deformed, the image signals cannot be sampled with a high accuracy. Thus pixels are deviated from the predetermined position to thereby lower the quality of the image. The following embodiments are provided for exactly sampling the image signals when reproducing the image signals.

Figure 23:
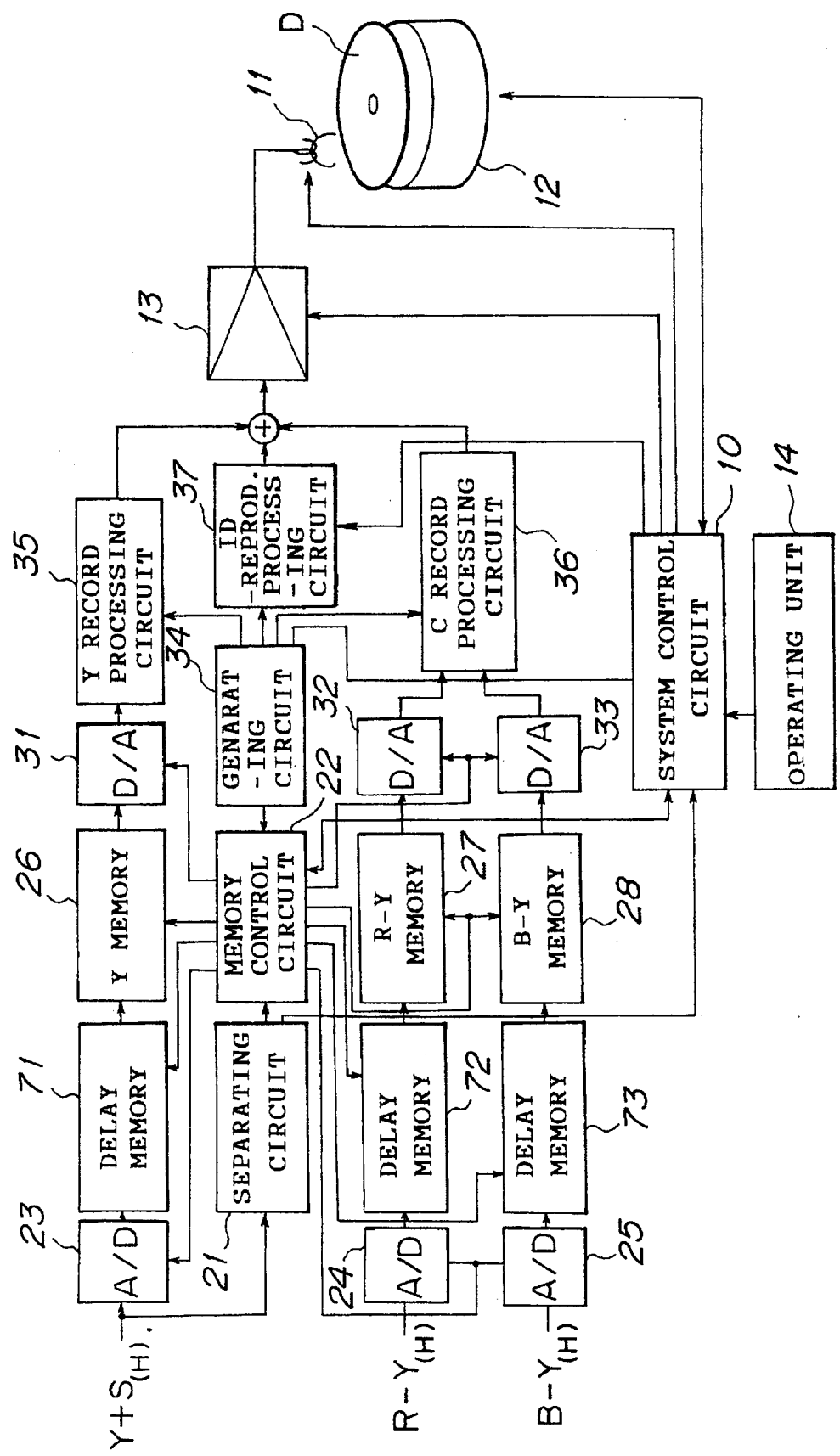
FIG. 23 is a block diagram showing a recording system of a still video device according to another embodiment of the present invention.

FIG. 23 is a block diagram showing a recording system of a still video device according to another embodiment of the present invention, in which image signals can be reproduced more exactly than in the embodiments shown in FIGS. 1 through 22. FIG. 23 corresponds to FIG. 1, and only the elements different from those of FIG. 1 are described below.

Image signals inputted to the still video device have been generated in accordance with the HDTV (High Definition TV) mode, and include synchronizing signals, respectively, similar to FIG. 1. Namely, this synchronizing signal is formed in accordance with the HDTV mode.

The luminance signal (Y+S) is A/D converted by the A/D converter 23, and stored in a delay memory 71 under the control of the memory control circuit 22, so that the digital luminance signal (Y+S) is delayed by a predetermined time before being stored in the Y-memory 26. This delay process will be described later in detail. Similarly, the R–Y differential color signal is A/D converted by the A/D converter 24 and stored in a delay memory 72, to be delayed by a predetermined time and then stored in the R–Y memory 27. The B–Y differential color signal is A/D converted by the A/D converter 25 and stored in a delay memory 73, to be delayed by a predetermined time and then stored in the B–Y memory 28. Note, when the luminance signal (Y+S), the R–Y differential color signal and the B–Y differential color signal are stored in the Y-memory 26, the R–Y memory 27 and the B–Y memory 28, respectively, these signals are subsampled or thinned out to a half thereof by the memory control circuit 22. The subsampling and interpolation for the subsampled signals are carried out as described above with reference to FIGS. 10 and 13.

FIG. 24 shows a relationship among inputted image signals, image signals recorded in the memories, and image signals recorded in the magnetic disk D. This drawing corresponds to FIG. 11, and the relationship is similar to that of FIG. 11. Note that, the inputted image signals are recorded in the frame recording mode, and the number of scanning lines and the line frequency of the inputted image signals are determined according to the HDTV mode.

The luminance signal (Y+S), the R–Y differential color signal and the B–Y differential color signal, which are inputted to the still video device, are delayed by a predetermined time and are then stored in the memories 26, 27 and 28. At this time, horizontal synchronizing signals S, which are included in front of the image signals, are also stored in the memories 26, 27 and 28 together with the image signals.

The image signals stored in the memories 26, 27 and 28 are time-expanded two times, when recorded in the magnetic disk D. Thus, the bandwidth of the image signal becomes $f_H/4$. Therefore, even if the inputted image signals have been formed according to the HDTV mode, the image signals are recorded in the magnetic disk D by the still video device while maintaining the high quality thereof. Further, when recording in the magnetic disk D, regarding the luminance signal (Y+S), an additional synchronizing signal X is added to a portion just in front of the horizontal synchronizing signal S, by the synchronizing signal generating circuit 34. The additional synchronizing signal X is formed according to a format (for example, the NTSC mode) for recording a signal in the magnetic disk D.

Figure 25:
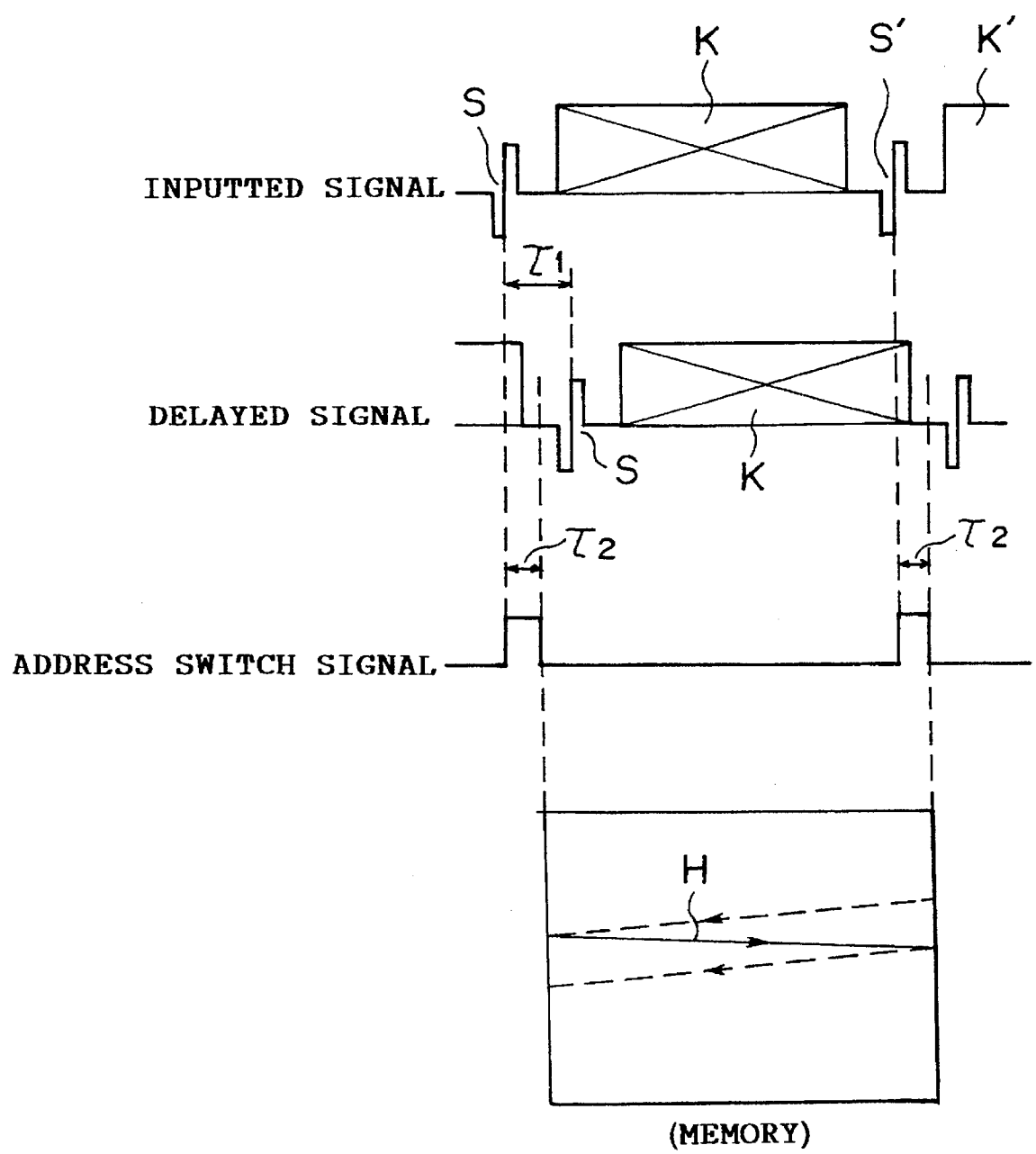
FIG. 25 is a diagram showing an operation in which an inputted signal to be stored in memories is delayed.

FIG. 25 shows an operation in which an inputted signal is delayed before being stored in the memories 26, 27 and 28.

The inputted signal has an image signal K, and the synchronizing signal S provided in front of the image signal K. A following synchronizing signal S' is provided behind the image signal K, and the next image signal K' is formed behind this synchronizing signal S'. Namely, the inputted signal is composed of the synchronizing signal and the image signal which are repeatedly formed.

The inputted signals are once stored in the delay memories 71, 72 and 73, and outputted with a delay time $\tau_1$, under the control of the memory control circuit 22. Thus, delayed signals, i.e., the signals outputted from the delay memories 71, 72 and 73 are inputted to the Y-memory 26, the R–Y memory 27 and the B–Y memory 28, respectively, by an operation of an address switch signal. The address switch signal is outputted from the memory control circuit 22, and is a pulse signal having a time breadth $\tau_2$. The delayed signals are inputted to the memories 26, 27 and 28 in synchronization with a drop of the address switch signal, which is outputted in front of the image signal K and behind the image signal K, respectively. The address switch signal outputted in front of the image signal K is dropped by a predetermined time ahead of the former synchronizing signal S, and the address switch signal outputted behind the image signal K is dropped by a predetermined time behind the rear end of the image signal K. Therefore, the synchronizing signal S and the image signal K are stored in the memories 26, 27 and 28 as a pair.

When the synchonizing signal S and the image signal K are stored in the memories 26, 27 and 28, the memory control circuit 22 resets a row address of the memories 26, 27 and 28 and counts up a line address of the memories, at every drop of the address switch signal. Accordingly, the synchronizing signal S and each of the pixel signals of the image signal K are sequentially stored from the first address to a predetermined address, in a predetermined line of the memories. Then, when the synchronizing signal S and the image signal K have been stored in one predetermined line, the next synchronizing signal S' and the image signal K' are stored in the next line. Namely, a synchonizing signal and an image signal, which correspond to one horizontal scanning line H, are stored in each of the lines of the memories 26, 27 and 28.

As described above, in this embodiment, the horizontal synchronizing signal S included in the inputted signal is maintained as it is, and is stored in the memories 26, 27 and 28. The horizontal synchronizing signal S has been provided in front of the image signal with a predetermined accuracy, and the positional relationship between the horizontal synchronizing signal S and the image signal is not changed by a process such as a D/A conversion and an FM-modulation after being read out from the memories 26, 27 and 28. Therefore, the horizontal synchronizing signal S and the image signal are recorded in the magnetic disk D while maintaining the predetermined positional relationship therebetween. Note that, when the horizontal synchronizing signal S and the image signal are recorded in the magnetic disk D, this recording operation being carried out based on the additional synchronizing signal X according to, for example, the NTSC mode.

Accordingly, when the image signals are reproduced from the magnetic disk D, a sampling operation of the image signals from the magnetic disk D is controlled based on a time from the horizontal synchronizing signal S, and thus is carried out with a high accuracy. Namely, the reproduction of the image signal is carried out with a high accuracy, and thus, the image is not distorted even when jitter occurs.

Figure 26:
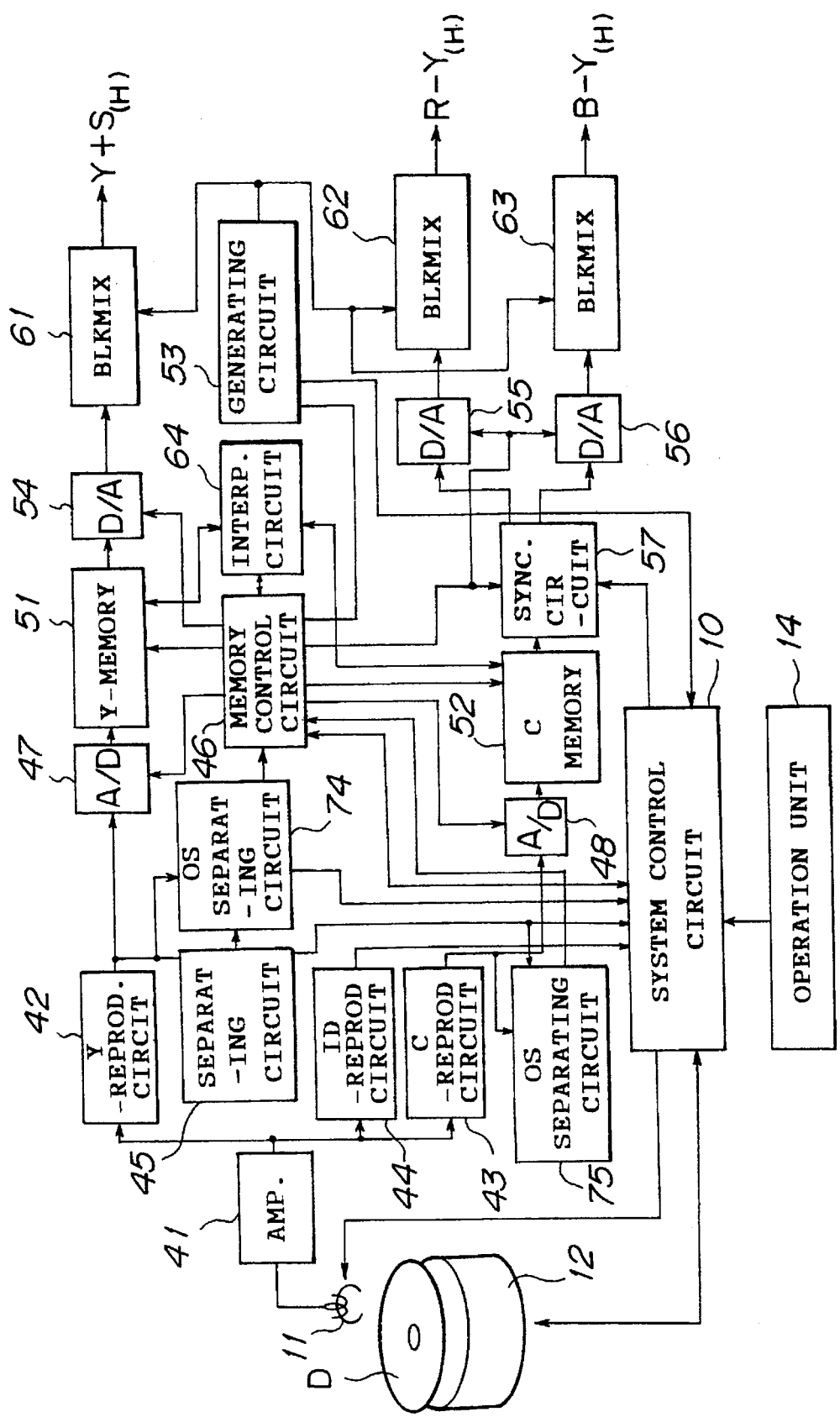
FIG. 26 is a block diagram of a reproducing system of the still video device using an additional synchronizing signal.

FIG. 26 shows a block diagram of a reproducing system of the still video device in which the additional synchronizing signal X is used. The components corresponding to those of FIG. 20 are shown by the same references as in FIG. 20, and only the components different from those of FIG. 20 are described below.

The magnetic head 11 is positioned at a predetermined track of the magnetic disk D, and reproduces ID codes and image signals recorded in this track. A reproducing amplifier 41 reads the image signals and the ID codes recorded in the magnetic disk D, and outputs the same to a Y-reproduction process circuit 42, a C-reproduction process circuit 43, and an ID-reproduction process circuit 44. The Y-reproduction process circuit 42 frequency-demodulates and outputs the additional synchronizing signal X and the luminance signals (Y+S), and the C-reproduction process circuit 43 frequency-demodulates and outputs an R–Y and a B–Y differential color signal. The ID-reproduction process circuit 44 DPSK-demodulates and outputs the ID codes.

The synchronizing signal separating circuit 45 separates the additional synchronizing signal X from the signal outputted from the Y-reproduction process circuit 42; an original synchronizing signal separating circuit 74 separates a horizontal synchronizing signal S from the luminance signals (Y+S) outputted from the Y-reproduction process circuit 42; an original synchronizing signal separating circuit 75 separates a horizontal synchronizing signal S from the R–Y and the B–Y differential color signal ouputted from the C-reproduction process circuit 43. These horizontal synchronizing signals S are transmitted to a memory control circuit 46 and the system control circuit 10. The memory control circuit 46 controls an A/D converter 47 and a Y-memory 51, based on the horizontal synchronizing signal S separated from the luminance signals (Y+S), and controls an A/D converter 44 and a C-memory 52, based on the horizontal synchronizing signal S separated from the R–Y and the B–Y differential color signal. Further, the memory control circuit 46 controls D/A converters 54, 55, 56, the Y-memory 51 and the C-memory 52, based on a synchronizing signal outputted from a synchronizing signal generating circuit 53.

The other components and operations are the same as those of FIG. 20.

Figure 27:
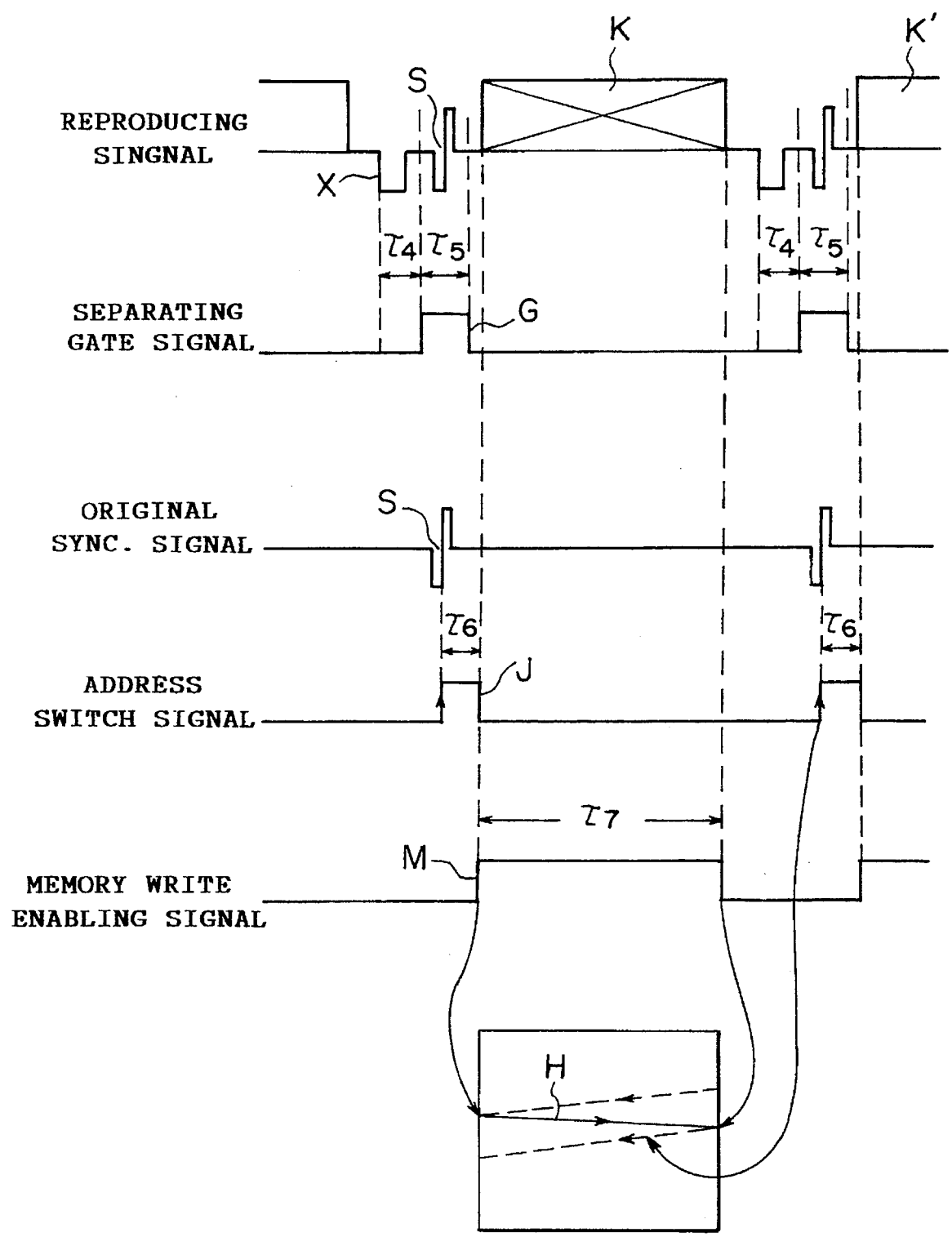
FIG. 27 is a diagram showing an operation in which a luminance signal included in an image signal is reproduced and stored in a memory.

FIG. 27 shows an operation in which a luminance signal included in an image signal is reproduced and stored in the memory 51.

The reproduced signal has image signal K, and the synchronizing signal S provided in front of the image signal K. An additional synchronizing signal X added by the synchronizing signal generating circuit 34 is provided in front of this synchronizing signal S. The additional synchronizing signal X, the original synchronizing signal S, and the image signal K appear repeatedly in the reproduced signal.

A separating gate signal G is outputted from the synchronizing signal separating circuit 45 to the original synchronizing signal separating circuit 74, to separate an original horizontal synchronizing signal from the reproduced signal. This separating gate signal G is a pulse signal outputted when a predetermined time $\tau_4$ has passed after a drop of the additional synchronizing signal X, and has a time breadth $\tau_5$. The reproduced signal is inputted to the original synchronizing signal separating circuit 74, and further, corresponding to the original synchronizing signal included in the reproduced signal, the separating gate signal G is inputted to the original synchronizing signal separating circuit 74. Accordingly, the original synchronizing signal S is separated from the reproduced signal and is outputted from the original synchronizing signal separating circuit 74.

Further, an address switch signal J is raised in synchronization with a zero cross point of the original synchronizing signal S, and is dropped after a predetermined time $\tau_6$ has passed, by an operation of the memory control circuit 46. Then, for a predetermined time $\tau_7$ after the drop of the address switch signal J, a memory write enabling signal M is outputted from the memory control circuit 46. The time $\tau_7$ for which the memory write enabling signal M is outputted corresponds to a length of the image signal K, and thus the image signal K is stored in the memory 51 in synchronization with the memory write enabling signal M.

When the image signal K is stored in the memory 51, the memory control circuit 46 resets a row address of the memory 51 and counts up a column address of the memory, at every drop of the address switch signal. Accordingly, each of the pixel signals of the image signal K is sequentially stored from the first address to a predetermined address, at a predetermined column of the memory. Then, when the image signal K is stored in a predetermined column, the image signal K' is stored in the next column. Namely, an image signal corresponding to one horizontal scanning line H is stored in each of the columns of the memory 51.

The R–Y and the B–Y differential color signal are stored in the memory 52 in the same way as the luminance signal (Y+S).

As described above, in this embodiment, the horizontal synchronizing signal S included in the inputted signal is used as a synchronizing signal for storing image signals to the memories 51 and 52. The horizontal synchronizing signal S is provided in front of each of the image signals, with a predetermined accuracy, and a positional relationship between the horizontal synchronizing signal S and the image signal is not changed before the reproducing process. Therefore, the image signal is reproduced while maintaining a high accuracy, substantially the same as when inputted to the still video device, whereby a high definition image can be obtained.

As described above, in the embodiments shown in FIGS. 23 through 27, the inputted signal is delayed, and then the horizontal synchronizing signal positioned in front of the image signal K is stored together with the image signal K in the memories 26, 27 and 28. Alternately, the horizontal synchronizing signal S' positioned behind the image signal K may be stored together with the image signal K in the memories 26, 27 and 28.

In the embodiments shown in FIGS. 1 through 22, in which one frame is divided into a plurality of portions so that image signals are recorded in a magnetic disk, an image signal corresponding to one horizontal synchronizing signal is divided into, for example, two portions, and recorded in two tracks of the magnetic disk. Therefore, when amplitude levels of the image signals recorded in the two tracks are different from each other, a join corresponding to the divided portion appears in the reproduced frame. Thus a favorable image is not obtained. The following embodiments are provided for obtaining a still video device in which the join does not appear in the reproduced image.

Here, it is assumed that image signals are divided into two parts and stored in memories in the still video device in the same manner as shown in FIG. 2, and a relationship between image signals inputted to the still video device and image signals stored in a magnetic disk is such as shown in FIG. 3.

Figure 28:
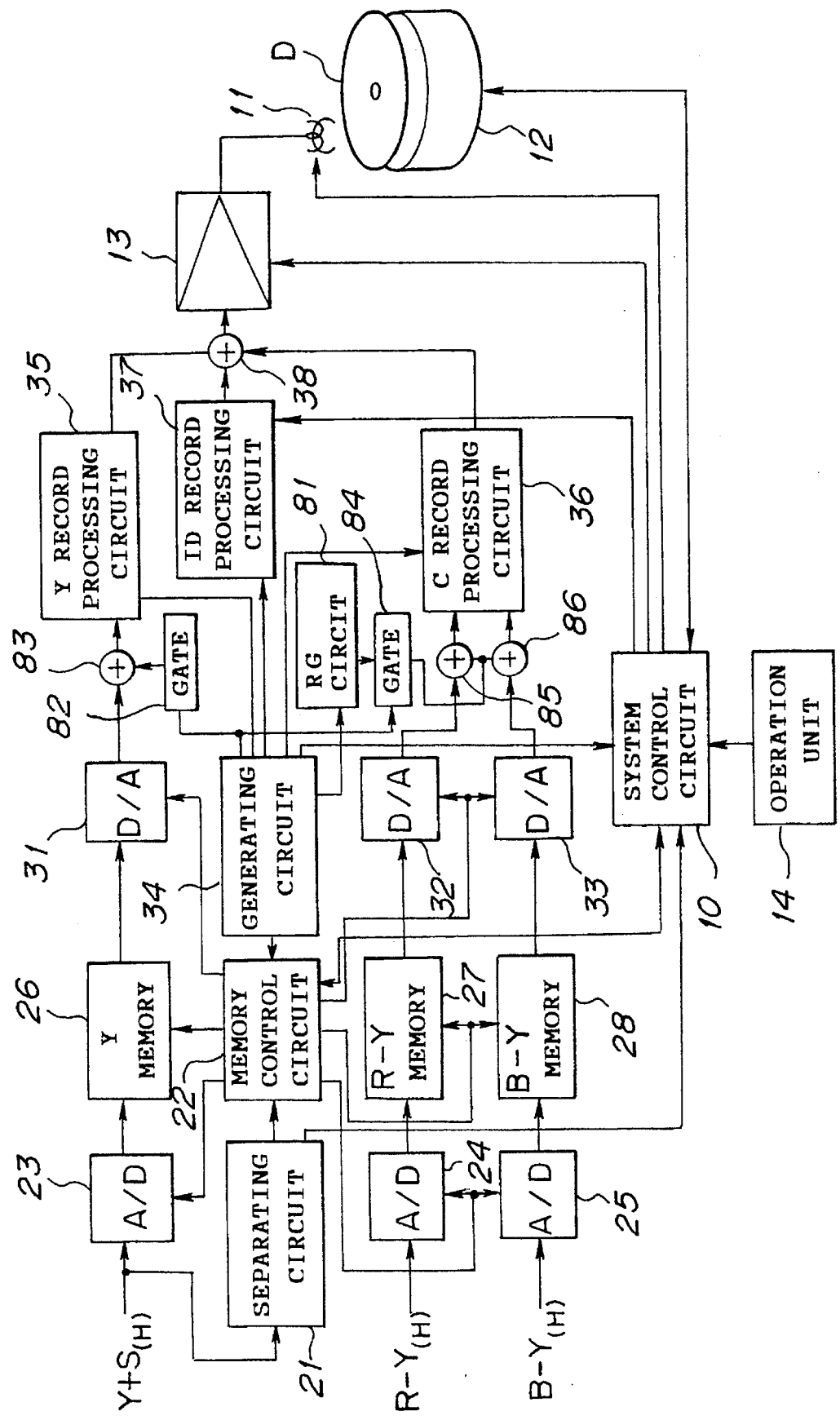
FIG. 28 is a block diagram showing a recording system of a still video device according to still another embodiment of the present invention.

FIG. 28 is a block diagram showing a recording system of a still video device according to still another embodiment of the present invention, in which a join does not appear in the reproduced image, and only the elements different from those of FIG. 1 are described below.

A reference signal generating circuit 81 outputs a square-wave signal (i.e., a reference signal) having a predetermined amplitude, based on a pulse signal outputted from the synchronizing signal generating circuit 34. A gate circuit 82 outputs a gate signal, for passing the reference signal outputted from the reference signal generating circuit 81 therethrough. Namely, while the gate signal is outputted from the gate circuit 82, the reference signal outputted from the reference signal generating circuit 81 is inputted to an adder 83, in which the reference signal is added to the luminance signal Y outputted from the D/A converter 31. The reference signal and the luminance signal Y are inputted to the Y-record processing circuit 35, and the signals are subjected to a process such as an FM-modulation.

Similarly, the reference signal outputted from the reference signal generating circuit 81 is inputted to adders 85 and 86 through a gate circuit 84, so that the reference signal is annexed to the R–Y and the B–Y differential color signal, respectively. The reference signal and the R–Y and the B–Y differential color signal are inputted to the C-record processing circuit 36, and the signals are subjected to a process such as an FM-modulation.

Figure 29:
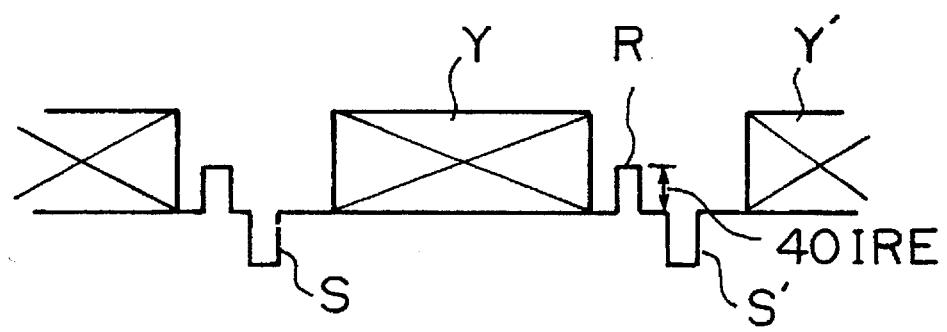
FIG. 29 is a diagram showing a relationship between a luminance signal and a reference signal.

FIG. 29 shows a relationship between the image signal inputted in the Y-record processing circuit 35, i.e., the luminance signal Y, and the reference signal R.

The luminance signal Y corresponds to one horizontal scanning line, and a horizontal synchronizing signal S is provided in front of each luminance signal Y. The reference signal R is provided between the luminance signal Y and a horizontal synchronizing signal S' positioned in front of the luminance signal Y' following the luminance signal Y. Each of the horizontal synchronizing signals Y and Y' is a negative signal, and has a polarity opposite to that of the luminance signal Y. The reference signal R is a positive square-wave signal, and has the same polarity as the luminance signal Y. The amplitude of the reference signal R is 40 IRE (Institute of Radio Engineers), for example. The luminance signal Y stored in the Y-memory 26 is adjusted in such a manner that "white", having the highest lightness, corresponds to 100 IRE. Therefore, in a signal stored in the Y-record processing circuit 35, the amplitude of the reference signal R is 40% of the "white". Note that, regarding the R–Y and the B–Y differential color signal, a reference signal having a 40 IRE amplitude, for example, is provided between the image signal and the horizontal synchronizing signal following the image signal.

In the reproduction system of the still video device, the amplitude of the image signal is adjusted based on the reference signal annexed to the image signal, and thus a reproduction of the image signal is carried out as described later.

Figure 30:
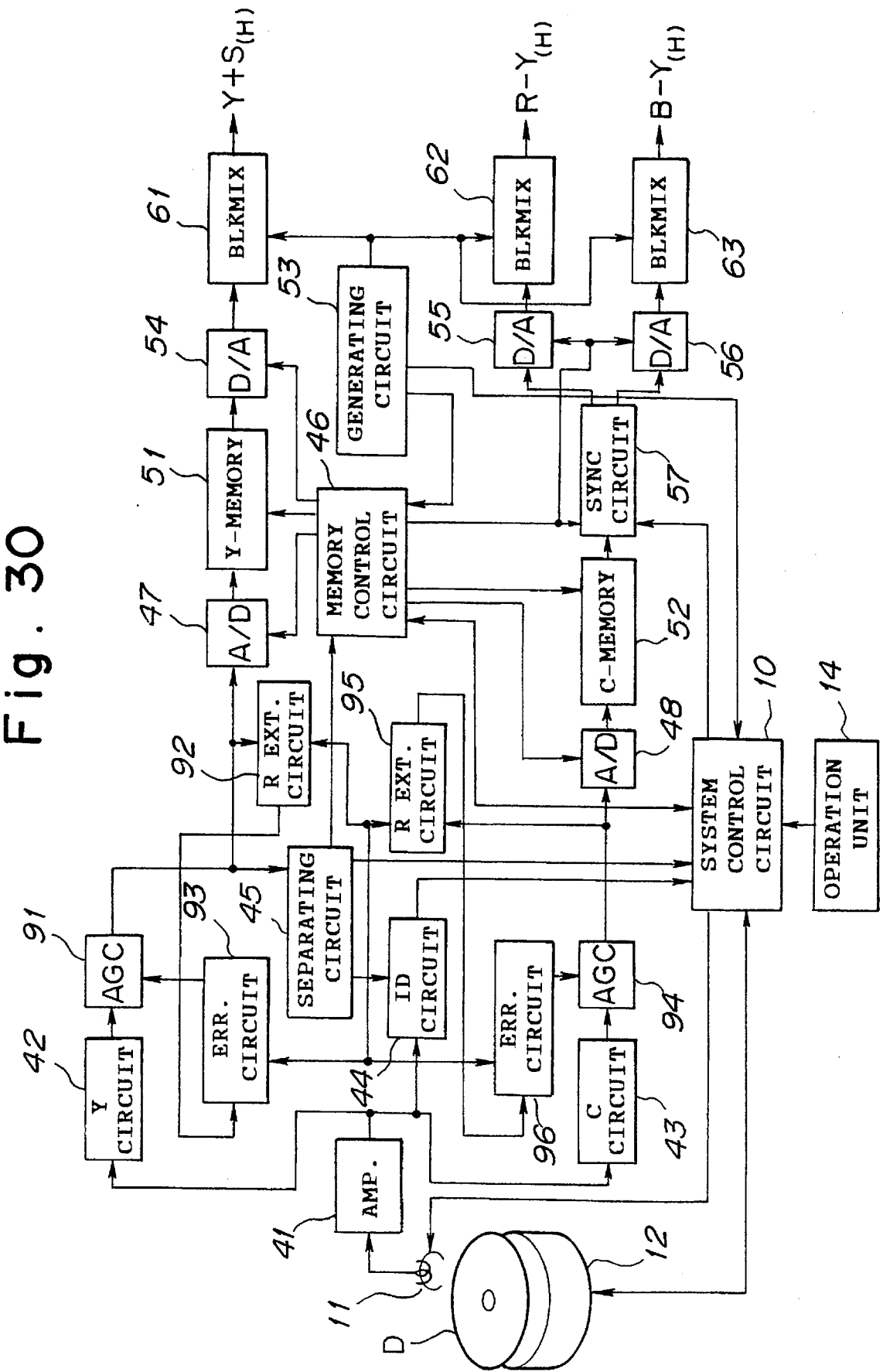
FIG. 30 is a block diagram of a reproducing system of a still video device in which the reference signal is used.

FIG. 30 shows a block diagram of a reproducing system of the still video device in which the reference signal R is used. The components corresponding to those of FIGS. 20 and 26 are shown by the same references as FIGS. 20 and 26, and only the components different from those of FIGS. 20 and 26 are described below.

An amplitude of the output signal (i.e., the luminance signal (Y+S)) of the Y-reproduction process circuit 42 is adjusted to a predetermined level by an auto gain control (AGC) circuit 91. The synchronizing signal separating circuit 45 extracts a horizontal synchronizing signal S from the luminance signal (Y+S) outputted from the AGC circuit 91. A reference signal extracting circuit 92 extracts the reference signal R from the luminance signal (Y+S). The horizontal synchronizing signal S is transmitted to the memory control circuit 46 and the system control circuit 10, respectively, and the reference signal R is transmitted to an error detecting circuit 93. The error detecting circuit 93 controls the AGC circuit 91 in such a manner that an amplitude of the reference signal R becomes 40 IRE. The output signal (i.e., the luminance signal (Y+C)) of the AGC circuit 91 is again inputted in the synchronizing signal separating circuit 45 and the reference signal extracting circuit 92, so that the horizontal synchronizing signal S and the reference signal R are extracted, respectively, as described above. According to such a feedback control, the output signal of the AGC circuit 91 is adjusted so that the amplitude of the reference signal R included in the output signal becomes 40 IRE.

The R–Y and the B–Y differential color signal are controlled by the AGC circuit 94, the reference signal extracting circuit 95 and the error signal detecting circuit 96 similar to the above. Namely, the output signals (i.e., the R–Y and the B–Y differential color signal) of the AGC circuit 94 are adjusted so that the amplitude of the reference signals R included in the output signals becomes 40 IRE.

The other components and operations are the same as those of FIGS. 20 and 26.

As described above, in this embodiment, when the image signal is recorded in a magnetic disk, the reference signal R having an amplitude of 40 IRE is annexed to the image signal adjusted in such a manner that "white" is 100 IRE. Therefore, when the image signal is reproduced, the amplitude of the image signal is adjusted so that the amplitude of the reference signal R becomes 40 IRE, whereby the image signal has the same amplitude as that when the image signal is recorded in the magnetic disk D. Namely, the image signals corresponding to each of the divided portions of a frame are controlled so as to have the same amplitude (i.e., brightness) as before the division. Therefore, even when one frame is divided into two parts, as shown, for example, in FIG. 2, joins do not appear in the reproduced image.

Figure 31:
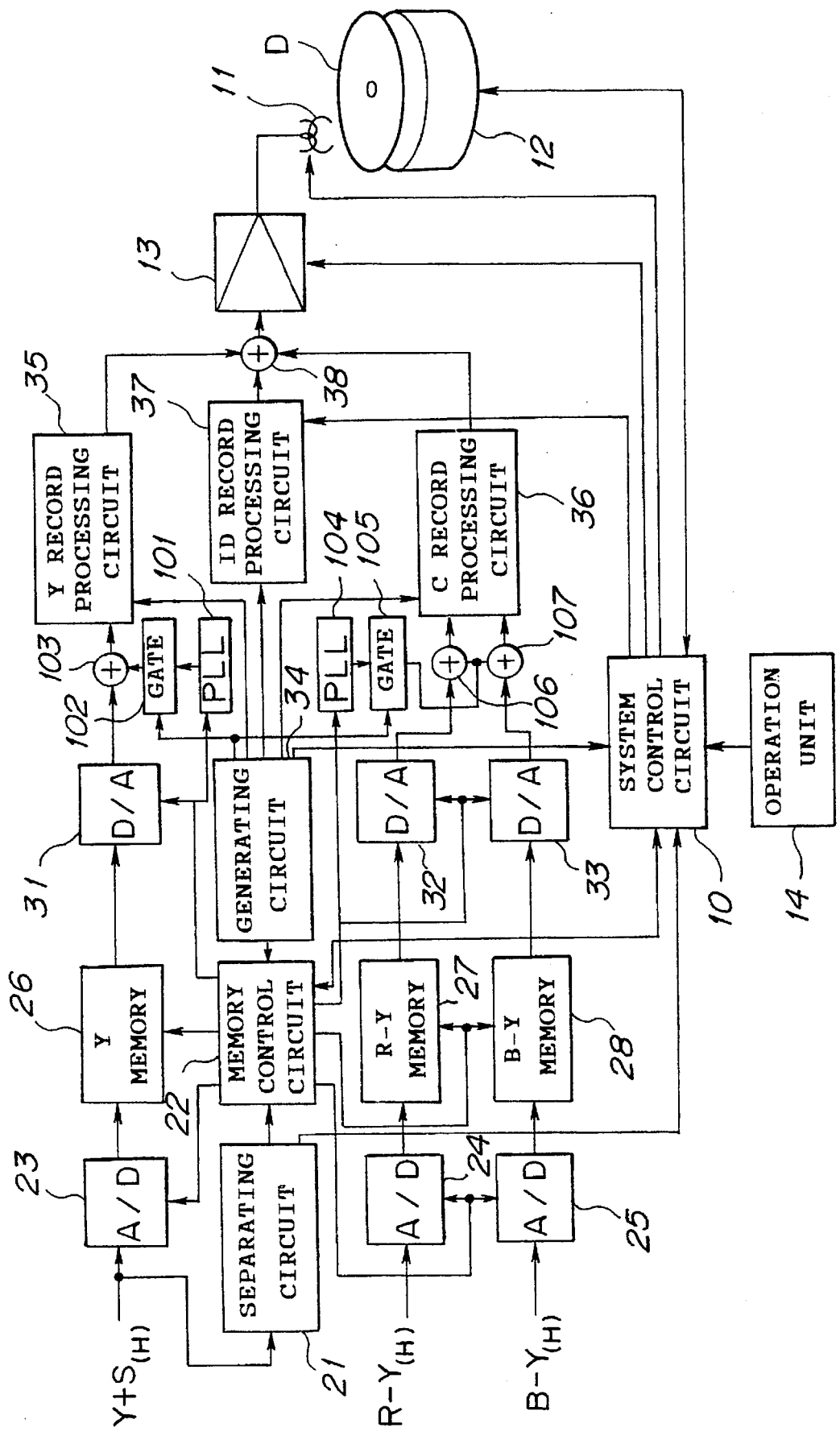
FIG. 31 is a block diagram showing a recording system of a still video device according to another embodiment of the present invention.

FIG. 31 is a block diagram showing a recording system of a still video device according to a still further embodiment of the present invention, in which a join does not appear in the reproduced image, and only the elements different from those of FIG. 28 are described below.

A phased lock loop (PLL) circuit 101 outputs a sine-wave signal having a constant phase difference and a constant frequency ratio, relative to the sampling clock signal outputted from the memory control circuit 22. A gate circuit 102 allows the sine-wave signal outputted from the PLL circuit 101 to pass therethrough, and a gate pulse is outputted from the synchronizing signal generating circuit 34. Such a sine-wave signal (a reference burst signal) outputted from the PLL circuit 101 while the gate pulse is outputted is inputted to an adder 103 as the reference signal, and is annexed to the luminance signal Y outputted from the D/A converter 31. This reference burst signal is a reference signal used for adjusting an amplitude of the image signal, similar to the embodiment shown in FIGS. 28 through 30, and a value of peak-to-peak is 40 IRE, for example. The reference burst signal is also used for correcting an effect due to jitter of the disk device as described later. Note that, a relationship between the luminance signal Y and the reference burst signal, and a relationship between the R–Y and the B–Y differential color signal and the reference burst signal are described later.

A PLL circuit 104 outputs a clock signal having a constant phase difference and a constant frequency ratio, relative to the sampling clock signal outputted from the memory control circuit 22. A gate circuit 105 outputs a sine-wave signal and a gate pulse is outputted from the synchronizing signal generating circuit 34. The sine-wave signal (a reference burst signal) outputted in accordance with the gate pulse is inputted to adders 106 and 107, and is annexed to the R–Y and the B–Y differential color signal, respectively.

Figure 32:
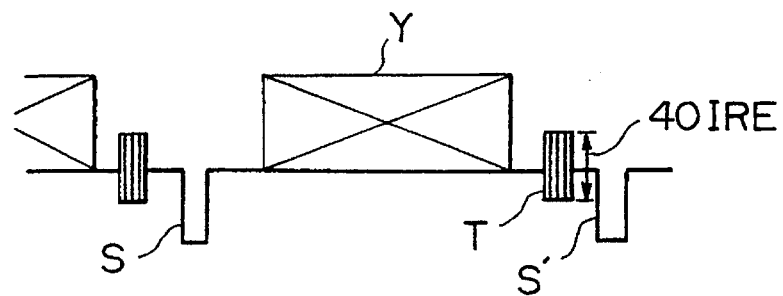
FIG. 32 is a diagram showing a relationship between an image signal and a reference burst signal.

FIG. 32 shows a relationship between an image signal (i.e., the luminance signal Y) inputted to the Y-recording process circuit 35 and the reference burst signal T. The luminance signal Y corresponds to one horizontal synchronizing signal, i.e., the horizontal synchronizing signal S is provided in front of each of the luminance signal Y. The reference burst signal T is provided between the luminance signal Y and the horizontal synchronizing signal S' positioned in front of a luminance signal following the luminance signal Y. The reference burst signal T is pulsated up and down about zero level, in a predetermined frequency. Note that, in the R–Y and the B–Y differential color signal, similar to the luminance signal, the reference burst signal is provided between the R–Y or the B–Y differential color signal and the following horizontal synchronizing signal.

Figure 33:
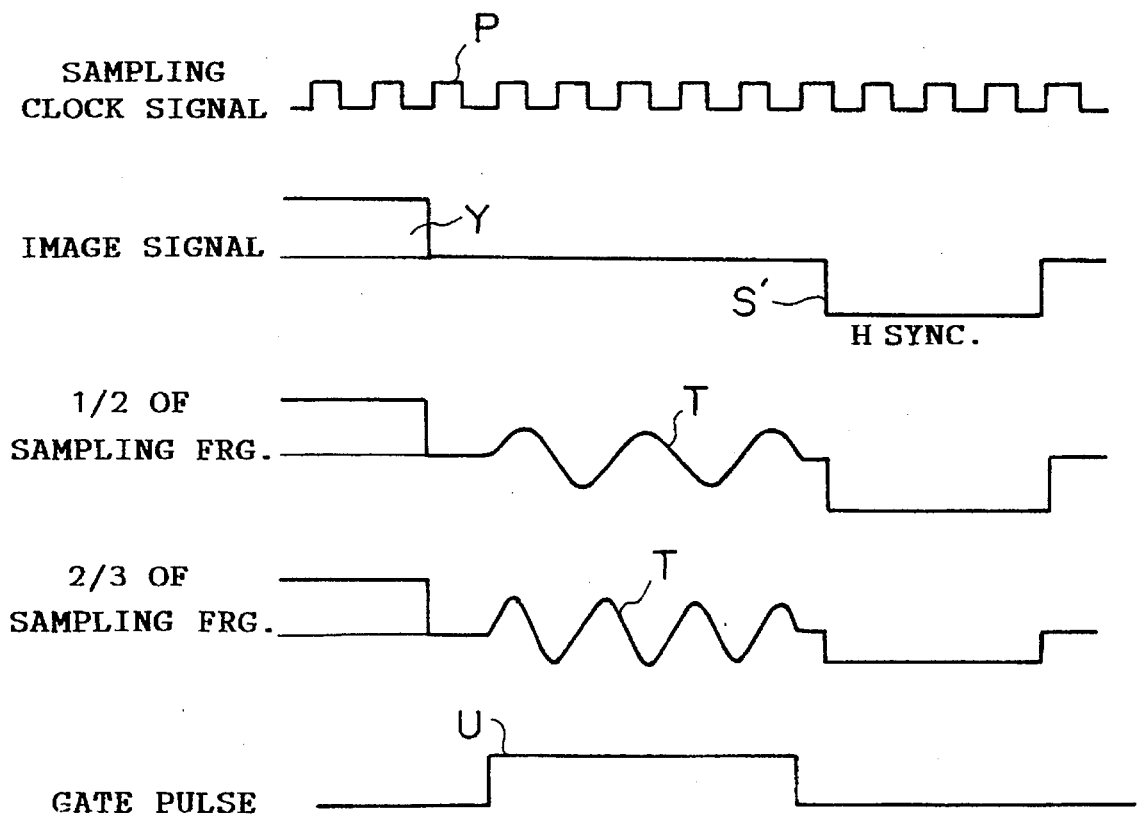
FIG. 33 is a diagram showing an adding operation of the reference burst signal to an image signal.

With reference to FIG. 33, an annexing operation of the reference burst signal to an image signal is described below.

A sampling clock signal P is outputted from the memory control circuit 22, and is used for controlling not only an operation of generating the reference burst signal but also an operation of the D/A converter 31, and so on. A period in which there are substantially no image signals is provided between the image signal (a luminance signal Y is shown in FIG. 33 as an example) and the horizontal sychronizing signal S' following the image signal. This is obtained by stopping a reading operation of the image signal from the memory at a timing earlier than a usual timing. The reference burst signal T is inserted between the luminance signal Y and the horizontal synchronizing signal S' following the luminance signal S'. FIG. 33 shows a case in which the frequency of the reference burst signal is a ½ that of the sampling frequency, and a case in which the frequency of the reference burst signal is ⅔ that of the sampling frequency, respectively.

The sampling clock signal P is inputted to the PLL circuit 101, and the PLL circuit 101 outputs a sine-wave signal having a predetermined phase difference relative to the sampling clock signal, and a frequency smaller than that of the sampling clock signal (the sampling frequency) by a predetermined ratio. Namely, a frequency of this sine-wave signal is, for example, ½ or ⅔ of the sampling frequency. Note that, when this ratio is a fraction of an integer, the PLL circuits 101 and 104 can be replaced by a frequency divider (a counter), thus simplifying the construction. The synchronizing signal generating circuit 34 outputs a gate pulse U, for inserting the reference burst signal, to the gate circuit 102. The gate pulse U is outputted between the luminance signal Y and the horizontal synchronizing signal S' following the luminance signal Y. While the gate pulse U is outputted, the sine-wave signal is outputted to the adder 103 and annexed between the luminance signal Y and the following horizontal synchronizing signal S', as the reference burst signal T.

In a reproducing sysytem of this still video signal, as described later, the reference burst signal annexed to the image signal operates as a reference signal, similar to the embodiment shown in FIGS. 28 through 30, and a sampling clock is generated based on the reference burst signal. Thus an image signal is reproduced in accordance with the sampling clock.

Figure 34:
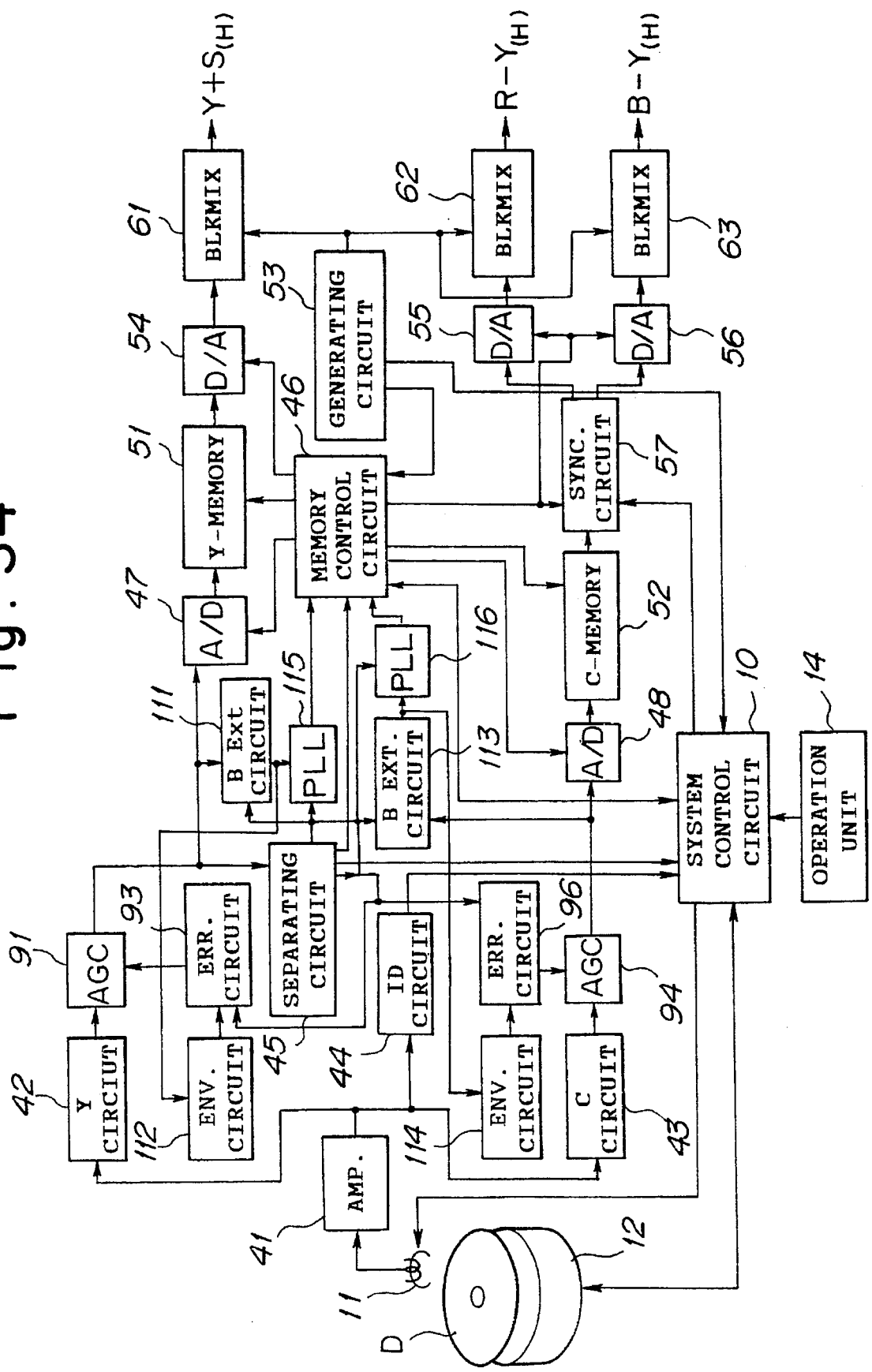
FIG. 34 is a block diagram of a reproducing system of a still video device in which the reference burst signal is used.

With reference to FIG. 34, a construction of a reproducing system of the still video device is described. Only the elements different from those of FIG. 30 are described below.

A burst signal extract circuit 111 extracts a reference signal, i.e., the reference burst signal T, from the luminance signal (Y+S) outputted from the AGC circuit 91. This reference burst signal T is transmitted to an envelope detection circuit 112, which envelope-detects the reference burst signal T, and outputs the envelope signal of the reference burst signal T to the error detection circuit 93. The error detection circuit 93 controls the AGC circuit 91 in such a manner that a double amplitude of the envelope signal of the reference burst signal T becomes 40 IRE. An output signal of the AGC circuit 91 (a luminance signal (Y+S)) is inputted to the burst signal extract circuit 111. Thus the horizontal synchronizing signal S and the reference burst signal T are extracted, respectively, as described above. Due to such a feedback control, the output signal of the AGC circuit 91 is adjusted in such a manner that the amplitude of the reference signal R included in the output signal becomes 40 IRE.

The R-Y and the B-Y differential color signal are controlled by the AGC circuit 94, a burst signal extract circuit 113, an envelope detection circuit 114 and the error signal detecting circuit 96, similar to the above. Namely, the output signals (i.e., the R-Y and the B-Y differential color signal) of the AGC circuit 94 are adjusted in such a manner that a double amplitude of the envelope signal of the reference burst signal T included in these output signals become 40 IRE, respectively.

The reference burst signal T has a double amplitude of 40 IRE relative to the image signal adjusted in such a manner that "white" is 100 IRE. Therefore, when the image signal is reproduced, the amplitude of the image signal is adjusted in such a manner that the double amplitude of the reference burst signal T becomes 40 IRE, whereby the image signal has the same amplitude as that when the image signal is recorded in the magnetic disk D. Namely, the image signals corresponding to each of the divided portions of a frame is controlled to have the same amplitude (i.e., brightness) as before the division. Therefore, even when one frame is divided into two parts, similar to the embodiment shown in FIGS. 28 through 30, joins do not appear in the reproduced image.

A PLL circuit 115 generates a pluse signal having a high frequency which is the same as the sampling clock signal P (FIG. 33), and frequency-divides this high frequency pulse signal to generate a pulse signal having a frequency according to a ratio (½, ⅔, for example) of the frequency of the reference burst signal and the sampling frequency set in the recording system. Namely, the PLL circuit 115 generates a pulse signal having the same frequency as the reference burst signal T. Then, the PLL circuit 115 compares the phase difference of this pulse signal and the reference burst signal T outputted from the burst signal extract circuit 111, and finely adjusts the phase of the pulse signal so that the phase difference coincides with a phase difference between the sampling clock signal P and the reference burst signal T set in the recording system. The fine adjustment of the phase is carried out a plurality of times in accordance with the frequency of the reference burst signal (5 fine adjustments when the reference burst signal is vibrated 5 times, for example). Accordingly, when the fine adjustments are carried out a plurality of times, the phase of the pulse signal is exactly adjusted. Then, the PLL circuit 115 continuousely outputs the sampling clock signal P having the same phase as the pulse signal. Thus, a sampling clock signal P which is the same as the recording system is outputted by the PLL circuit 115.

Similarly, regarding the R-Y and the B-Y differential color signal, the sampling clock signal P is outputted by the burst signal extracat circuit 113 and a PLL circuit 116.

The reference burst signal T is integrally provided with the image signal. Therefore, when the image signal fluctuates before and behind due to a jitter of the disk device, the reference burst signal T fluctuates in synchronization with the fluctuation of the image signal. Therefore, by using the reference burst signal T, a sampling clock signal which is not affected by jitter is generated.

As described above, in this embodiment, when the image signal is recorded in the magnetic disk, the reference burst signal (i.e., the reference signal) having a predetermined amplitude is inserted between the image signal and the horizontal synchronizing signal, based on the sampling signal. When this image signal is reproduced, the amplitude of the image signal is adjusted based on the reference burst signal. Therefore, similar to the embodioment shown in FIGS. 28 through 30, an image in which a join does not appear in the frame can be obtained.

Further, in this embodiment, in a reproducing operation, the sampling clock signal is generated based on the reference burst signal. Since the reference burst signal is fluctuated in one body with the image signal, even when jitter occurs in the disk device, the positional relationship of the image signal and the reference burst signal is not changed. Further, since the reference burst signal oscillates with a predetermined frequency, in a reproducing operation, the PLL circuits 115 and 116 can compare the phase difference of the pulse signal and the reference burst signal a plurality of times. Therefore, during this comparison, the phase of the pulse signal can be finely adjusted. Thus a sampling clock signal which is the same as that of the recording operation can be generated. Accordingly, even if jitter occurs in the disk device, the jitter can be corrected and a high quality image thus reproduced.

Figure 35:
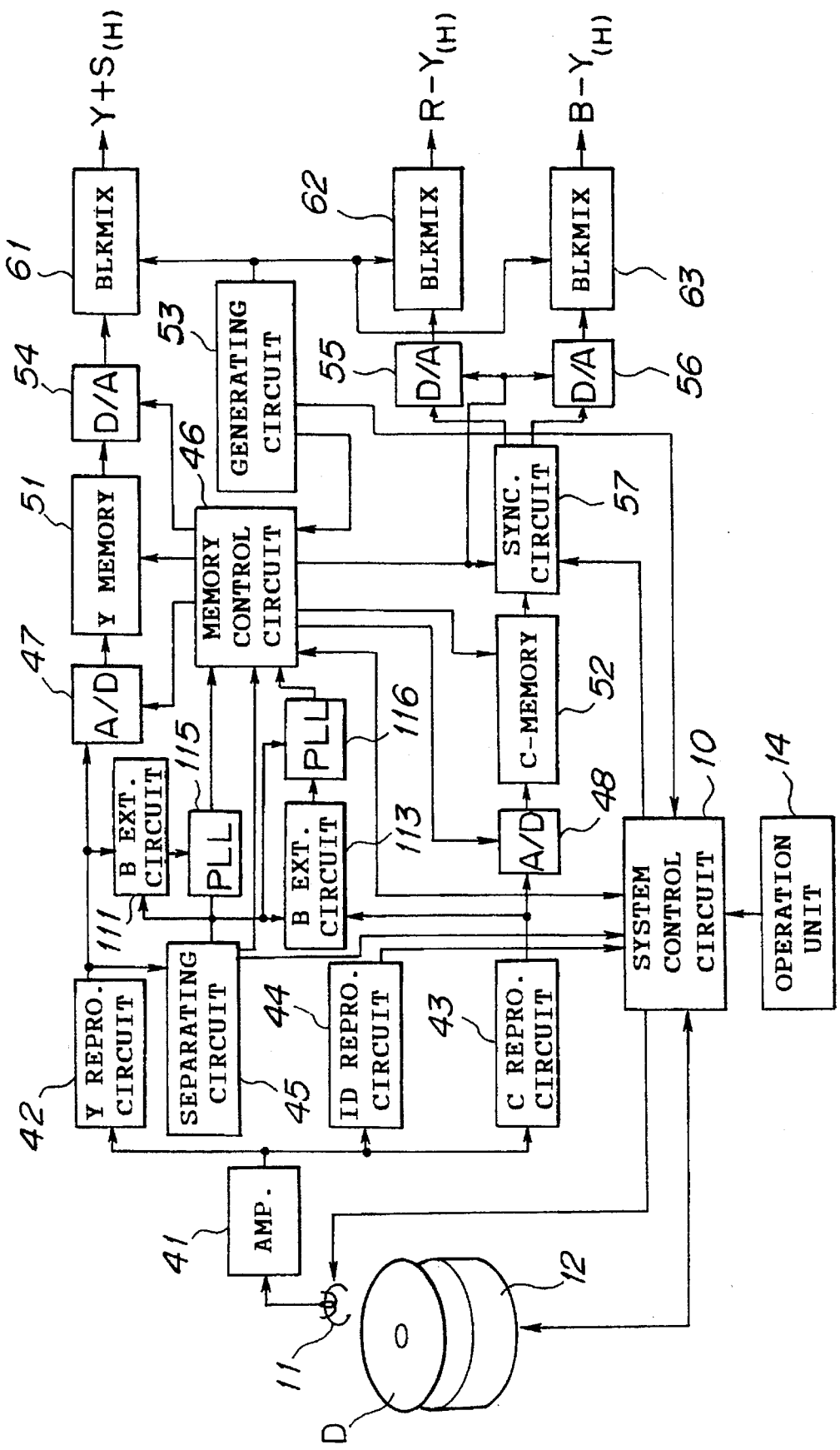
FIG. 35 is a bock diagram of a reproducing system of the still video device of another embodiment.

FIG. 35 shows a construction of a reproducing system of the still video device of another embodiment. Only the components different from those of FIG. 34 are described below.

In FIG. 35, this reproducing system is not provided with the AGC circuits 91 and 94, the error detection circuits 93 and 96, and the envelope detection circuits 112 and 114, in comparison with that of FIG. 34; the other components are basically the same as FIG. 34. Namely, the synchronizing signal separating circuit 45 extracts a horizontal synchronizing signal S from the luminance signal (Y+S) outputted from the Y-reproduction process circuit 42, and generates a gate pulse U (see FIG. 33) for extracting the reference burst signal. The horizontal synchronizing signal S is transmitted to the memory control circuit 46 and the system control circuit 10, and the gate pulse U is transmitted to the burst signal extract circuits 111 and 113, and the PLL circuits 115 and 116. The burst signal extract circuit 111 extracts the reference burst signal T (see FIG. 33) from the luminance signal (Y+S) outputted from the Y-reproduction process circuit 42.

An operation and an effect of this reproducing system is the same as that of the reproducing system shown in FIG. 34, except that the amplitude of the reference burst signal is adjusted as in the embodiment shown in FIG. 34. Namely, according to the embodiment shown in FIG. 35, in a reproducing operation, even if jitter occurs in the disk device, the jitter can be corrected and a high quality image reproduced.

Note that, although image signals are recorded in the frame recording mode in the above embodiments, the present invention can be applied to a field recording mode in which one frame is composed of one field.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. HEI3-268104 (filed on Jul. 16, 1991), HEI 3-285382 (filed on Aug. 9, 1991), HEI 3-296745 (filed on Aug. 26, 1991), and HEI 3-296746 (filed on Aug. 26, 1991), which are expressly incorporated herein by reference in their entirety.

I claim:

1. A still video device in which high definition image signals are recorded on concentric tracks of a recording disk, said still video device comprising:

means for dividing a high definition image signal corresponding to one frame into a plurality of parts by at least one dividing line that is substantially perpendicular to horizontal scanning lines of said high definition image signal, said one frame comprising a first field and a second field;

means for recording said plurality of parts on separate tracks of said recording disk;

means for adding a distinct reference signal to each of said plurality of parts when said recording means records said plurality of parts on said recording disk; and means for reproducing said plurality of parts, said plurality of divided parts being combined by said reproducing means in such a manner that horizontal scanning lines, corresponding to each of said plurality of parts included in a same field, are connected to each other to re-create said high definition image signal, said reproducing means comprising:

means for detecting an amplitude of said distinct reference signal; and means for adjusting an amplitude of each of said plurality of parts to a same predetermined level in accordance with said detected amplitude of said distinct reference signal.

2. The still video device of claim 1, wherein said frame is divided into four parts by a first line that extends in a vertical direction and which passes through a center of said frame, and a second line that extends in a horizontal direction and which passes through said center of said frame.

3. The still video device of claim 1, wherein said recording means records said plurality of parts to a plurality of recording areas of said recording disk.

4. The still video device of claim 1, wherein said recording means records said plurality of parts to one recording area of said recording disk.

5. The still video device of claim 1, further comprising means for time-expanding said plurality of parts to change a bandwidth of said plurality of parts to a bandwidth in which said plurality of parts can be recorded on said recording disk, said high definition image signal of said first field and said second field being recorded on separate tracks of said recording disk.

6. The still video device of claim 5, wherein information necessary for dividing said image signals and time-expanding said image signals is stored on a portion of said recording disk in which ID codes are recorded.

7. The still video device of claim 1, further comprising means for reproducing said image signals recorded to said recording disk, while time-compressing said image signals.

8. The still video device of claim 7, wherein information necessary for reproducing said plurality of parts of said divided image signals is stored in a portion of said recording disk in which ID codes are recorded.

9. The still video device of claim 1, wherein said recording means subsamples said image signals and records said subsampled image signals to said recording disk.

10. The still video device of claim 9, further comprising means for reproducing said subsampled image signals recorded to said recording disk, while time-compressing and interpolating said subsampled image signals.

11. The still video device of claim 1, wherein a first synchronizing signal is provided at a beginning of each of said divided image signals, said still video device further comprising means for adding a second synchronizing signal to each of said divided image signals, said recording means recording said divided image signals together with said first and second synchronizing signals to said recording disk, based on said second synchronizing signal.

12. The still video device of claim 11, wherein said adding means adds said second synchronizing signal in front of said first synchronizing signal of each of said image signals.

13. The still video device of claim 11, further comprising means for delaying said image signals so that said adding means adds said second synchronizing signal in front of each of said image signals.

14. The still video device of claim 11, further comprising means for reproducing said first synchronizing signal, said second synchronizing signal and said image signals recorded to said recording disk, means for separating said first synchronizing signal from signals reproduced by said reproducing means, and means for processing said image signals to be reproduced based on said first synchronizing signal.

15. The video device of claim 11, wherein said first synchronizing signal is formed according to a NTSC mode, and said second synchronizing signal is formed according to a high definition mode.

16. The still video device of claim 1, wherein said reference signal is provided between each of said image signals and a synchronizing signal positioned behind said each of said image signals.

17. The still video device of claim 1, wherein said reference signal comprises a square-wave signal.

18. The still video device of claim 1, wherein said reference signal comprises a burst signal having a predetermined frequency.

19. The still video device of claim 18, wherein a ratio of said frequency of said reference signal and a sampling clock frequency signal used for recording said image signals to said recording disk comprises a fraction of an integer.

20. The still video device of claim 18, wherein said reference signal is envelope-detected prior to said adjustment of an amplitude of said reference signal when said image signals are reproduced.

21. The still video device of claim 18, wherein said reference signal is generated based on a sampling signal that is used for recording said image signals on said recording disk.

22. The still video device of claim 18, further comprising means for generating a sampling clock signal that is used for reproducing said image signals based upon said reference signal.

23. The still video device of claim 1, wherein said reproducing means eliminates joins in a reproduced image of said one frame.

24. The still video device of claim 1, wherein said dividing means comprises means for dividing said one frame into four parts, said recording means recording image signals corresponding to said first field and said second field of each of said four parts on adjacent tracks of said recording disk.

25. The still video device of claim 1, wherein said dividing means comprises means for dividing said one frame into two parts, said recording means recording image signals corresponding to said one of said first field and said second field on adjacent tracks of said recording disk.

26. The still video device of claim 1, wherein said same predetermined level corresponds to a preselected amplitude level.

27. The still video device of claim 1, wherein said same predetermined level corresponds to a level of approximately 40 IRE.

28. A still video device in which image signals are recorded on concentric tracks of a recording disk, said still video device comprising:

means for dividing a frame of a high definition image signal, comprising a first field and a second field, into a plurality of parts by at least one dividing line that is substantially perpendicular to horizontal scanning lines of said high definition image signal;

means for adding a distinct reference signal to each of said plurality of parts, said distinct reference signal establishing an amplitude level for each of said plurality of parts;

means for recording said plurality of parts on separate tracks of said recording disk; and means for reproducing said plurality of parts, said plurality of parts being combined by said reproducing means in such a manner that horizontal scanning lines, corresponding to each of said plurality of parts included in a same field, are connected to each other to re-create said high definition image signal, said distinct reference signal being detected by said reproducing means so as to adjust an amplitude of each of said plurality of parts to eliminate join lines in said re-created high definition image signal.

29. The still video device of claim 28, wherein said distinct reference signal is used to set an amplitude of each of said combined plurality of parts to a predetermined amplitude level.

30. The still video device of claim 29, wherein said predetermined amplitude level comprises an amplitude of approximately 40 IRE.

31. The still video device of claim 28, wherein said recording means records said plurality of parts to a plurality of recording areas of said recording disk.

32. The still video device of claim 28, further comprising means for time-compressing said image signals when said image signals are reproduced.

33. A video device in which high definition image signals, comprising a first field and a second field, divided into a plurality of parts by at least one dividing line that is substantially perpendicular to horizontal scanning lines of said high definition image signal and recorded to a recording disk, are reproduced, a distinct reference signal being superimposed upon each of said plurality of parts when said plurality of parts are recorded to said recording disk, said video device comprising:

means for reproducing said plurality of parts recorded to said recording disk;

means for combining said plurality of parts in such a manner that horizontal scanning lines, corresponding to each of said plurality of parts included in a same field, are connected to each other to re-create said high definition image signal; and means for adjusting a reproduced level of said reference signal associated with each of said plurality of parts to have a predetermined value so that said re-created high definition image signal has no visible joins.

34. The video device of claim 33, wherein said predetermined value comprises a level substantially equal to 40 IRE.

35. The video device of claim 33, wherein said video device comprises a still video camera.

36. The video device of claim 33, further comprising means for time-compressing said reproduced plurality of parts.

37. The video device of claim 33, wherein said reference signal comprises a square-wave signal.

38. The video device of claim 33, wherein said reference signal comprises a burst signal having a predetermined frequency.

* * * * *